US006567544B1

(12) United States Patent
Kanno et al.

(10) Patent No.: US 6,567,544 B1
(45) Date of Patent: May 20, 2003

(54) IMAGE PROCESSING APPARATUS

(75) Inventors: Hiroki Kanno, Yokohama (JP); Takayuki Sawada, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/367,694

(22) PCT Filed: Dec. 4, 1998

(86) PCT No.: PCT/JP98/05494
§ 371 (c)(1),
(2), (4) Date: Aug. 19, 1999

(30) Foreign Application Priority Data

Dec. 19, 1997 (JP) ............................................. 9-350884

(51) Int. Cl.[7] ................................................. G06K 9/00
(52) U.S. Cl. ........................................ 382/169; 358/2.1
(58) Field of Search ................................ 382/169, 237; 358/455, 458, 461, 1.9, 2.1

(56) References Cited

FOREIGN PATENT DOCUMENTS

| JP | 401196975 A | * | 8/1989 | ............ H04N/1/46 |
|---|---|---|---|---|
| JP | 03068270 | * | 3/1991 | ............ H04N/1/40 |
| JP | 0475454 A2 | * | 3/1992 | .......... G01N/21/84 |
| JP | 405091324 A | * | 4/1993 | ............ H04N/1/40 |
| JP | 5-183749 | * | 7/1993 | ............ H04N/1/40 |
| JP | 406284269 A | * | 10/1994 | .......... H04N/1/387 |
| JP | 407273996 A | * | 10/1995 | .......... H04N/1/407 |

* cited by examiner

Primary Examiner—Jerome Grant, II
(74) Attorney, Agent, or Firm—Foley & Lardner

(57) ABSTRACT

A density distribution calculation section 201 calculates the density distribution of a document on the basis of input color image data and a background density level calculation section 202 calculates the background density level of the document on the basis of the calculated density distribution. A density conversion table preparing section 203 prepares a density conversion table on the basis of the background density level. An image conversion section 204 converts a density near a document background density of input color image data on the basis of the density conversion table. Even in the case of a document having a background color, it is possible to suppress a "back page" emergence while reserving the background color and, at the same time, reduce an uneven shade of background density.

18 Claims, 20 Drawing Sheets

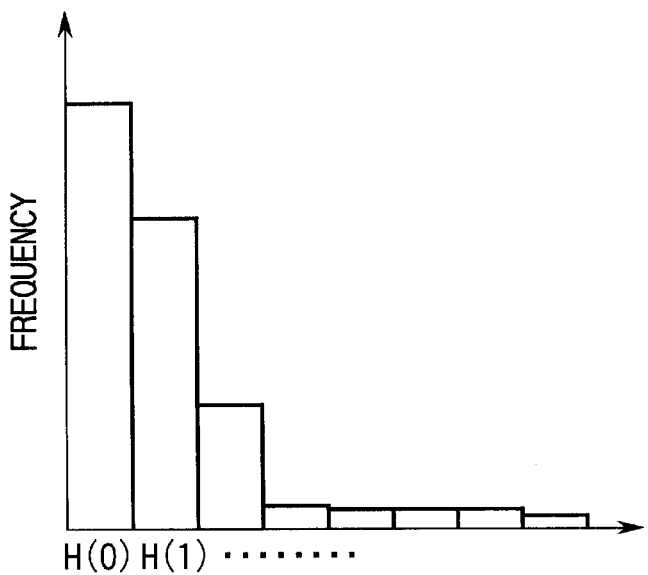
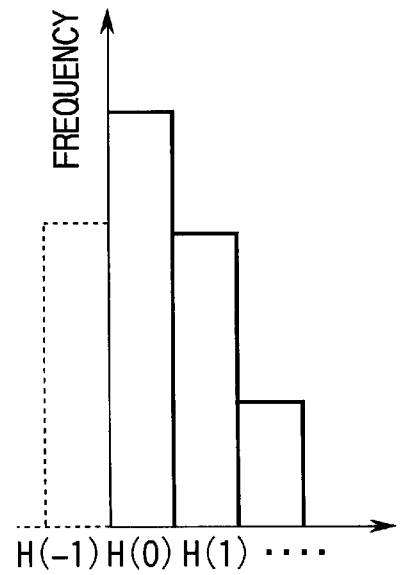
FIG. 23A  FIG. 23B
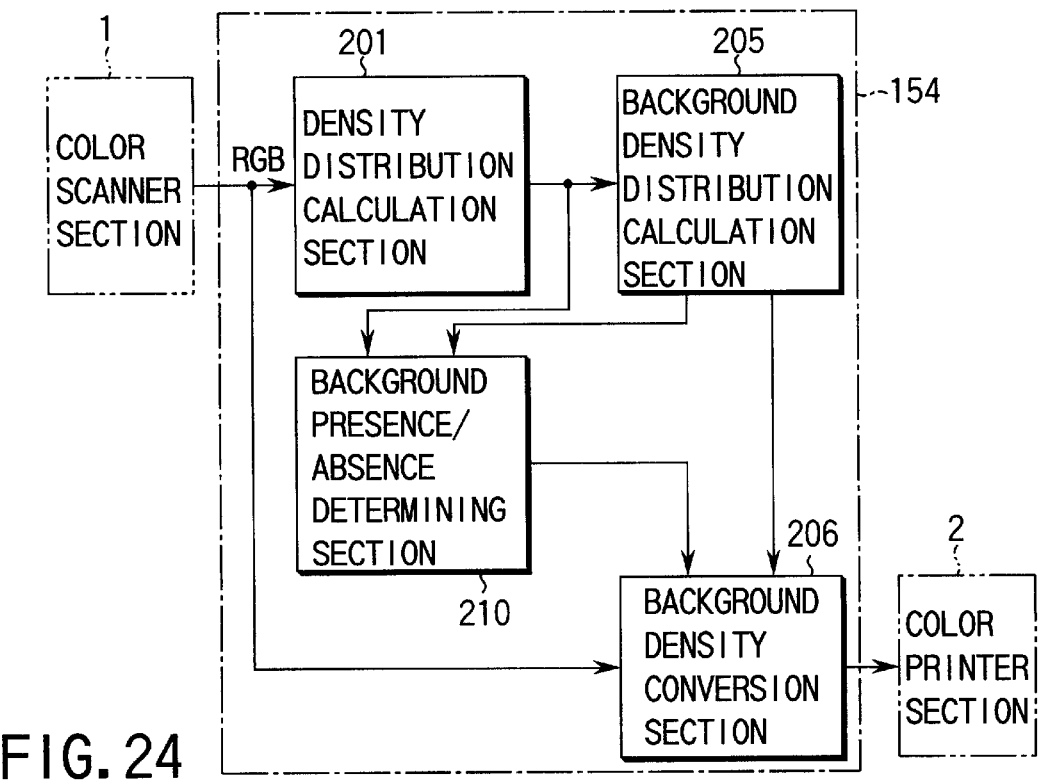
FIG. 24

IMAGE PROCESSING APPARATUS

TECHNICAL FIELD

The present invention relates to an image processing apparatus for processing a color image read out from a document on an image processing apparatus such as a digital type color copier for copying a color image and to an image forming apparatus for forming a color image with the use of this image processing apparatus.

BACKGROUND ART

Generally, various documents are used as an printing medium and there are sometimes the situations in which it is not necessary to faithfully copy a document in accordance with the use to which a copied image is put. In the case of a document, such as a newspaper and notebook, having a higher background tone, if such a background is faithfully reproduced, then characters in the background becomes lower in contrast and very illegible.

If the paper sheet is thinner in the magazine, etc., an image of a back page is often slightly visible on a front page side and, if an image is copied from the magazine page, then it is copied together with the image on the back page, so that a "back page" emergence occurs.

In the case where a copy is made from the newspaper, notebook, magazine and so on, copying is made with a thinner density tone set by a manual adjustment, so that the background tone and the "back page" emergence are not prominent.

The setting of the density as set out above is sometimes done automatically. In JPN PAT APPLN KOKAI PUBLICATION NO. 3-88569, the density adjustment level is automatically set by detecting the density distribution characteristic of an image as a whole and setting the density conversion characteristic with the density distribution characteristic as a parameter. By doing so, it is not necessary for the user to set the density level while considering the background tone of each document page. And copying is simply carried out.

In the case where the document, such as the newspaper, having the background tone is copied with the copying density adjusted to a low density level, the background tone becomes thinner in level but, at the same time, the characters also become thinner in density level and does not necessarily become legible and does not always look clean and clear. Further, the same thing is also true of a document whose back page is somewhat visible from the front page side.

Further, the same situation is again encountered in the case where the setting of the density level is automatically done as set out above. Indeed, it is not necessary for the user in the automatic setting method to set the density level with the background tone in mind and a readier copying operation can be carried out, but not only the background tone but also characters in the background becomes thinner.

In the case where color copying is carried out, another problem occurs. A color document is usually often given a background color tone intentionally and it is not always desirable to eliminate the background color. A distinction should be made between a document, such as the newspaper, whose background tone should be eliminated and a printed color document whose background tone should not be eliminated. For the former case only, the background should be eliminated.

For the document including a photograph, if the elimination of the background tone and that of a "back image" emergence is effected all at a time over a whole image, then the photograph section needs to have its density level to be faithfully reproduced but the density level of the photograph will be lowered. That is, it is necessary to prevent a background tone from being eliminated, and a "back image" emergence from being so processed, in the photograph section.

In the above-mentioned JPN PAT APPLN KOKAI NO. 3-88569, a "character" section and "photograph" section are identified on a pixel-by-pixel fashion and a corresponding density-level conversion is done with their suitable density-level conversion characteristic. By this method it is possible to properly effect the density-level conversion of the "photograph" section. At the "character" section included in the background, the background color tone will always be eliminated even if a given document is not desirable to have its background tone eliminated.

In the case where a color document, being prominent in a "back image" emergence in particular, has its emergence level lowered by lowering its background tone, some effect is gained if it has not any background color tone. If, on the other hand, the color document having a background color tone is copied, a aback image, emergence is lowered but the background color tone will change, thus presenting a problem. Therefore, if this is the case, then a countermeasure is to eliminate the "back image" emergence while reserving the background color tone.

Further, in the case of a color document having a background color tone in particular and having a greater background area over a document whole surface, uneven shades of density become prominent with the recording characteristics of an ordinary recording apparatus. If, in a digital copier for example, the background density is output at a constant level by detecting the background area, it is possible to suppress even the uneven shades of density.

DISCLOSURE OF INVENTION

An object of the present invention is to provide an image processing apparatus which, in the case of copying a document of a background density, lightens a background density and reserves a character density and, in the case of copying a document involving a "back image" emergence, lightens the background image and reserves a "surface" image density.

Another object of the present invention is to provide an image processing apparatus and image forming apparatus which, even in the case of a document additionally containing a photograph, converts a background density of a character area to another value and faithfully reserves the density of a photograph section and involves no change in color and in density.

Still another object of the present invention is to provide an image processing apparatus and image forming apparatus which, even if a document has a background color tone, can suppress a "back image" emergence while reserving the background color tone and reduce an uneven shade of background density.

In order to achieve the above-mentioned object, the image processing apparatus of the present invention comprises density distribution calculation means for calculating a density distribution of a document image on the basis of input document image density data, density range calculation means for calculating a density range corresponding to a background density of the document image on the basis of the density distribution calculated by the density distribution calculating means, and conversion means for converting the document image density contained in the background density range calculated by the density range calculating means to another density value and outputting it.

The density distribution calculation means has a histogram preparing means for preparing a density histogram representing color features of the document on the basis of the input image data, and the density range calculation means has means for deciding, as a background density level of the document, a density having a greatest frequency in a low density area of the histogram prepared by the histogram preparing means and calculating the background density range on the basis of the background density level.

The conversion means has means for converting, to a value "0", input image data below the background density level calculated by the density range calculation means.

The conversion means also has means for converting, to a value "0", input image data below the lower background density level calculated by the density range calculation means and converting input image data greater than the background density level in accordance with a predetermined function.

Further, the conversion means has means for converting, to a predetermined value, the input image data below the background density level calculated by the density range calculation means.

Still further, the conversion means has means for converting, to a predetermined value, only input image data contained in a predetermined density range containing the background density level calculated by the density range calculation means and outputting the other input image data directly.

Further, the density range calculation means has means for deciding, as being the background density range, a density range near the background density level having a frequency down to a frequency smaller by a predetermined value than a frequency of the background density level relative to the image data.

The apparatus according to the present invention is characterized by further comprising means for setting the document as being a color document or monochrome document and that the conversion means effects first background density conversion with respect to the document set as being a color document and effects second background density conversion set as being a monochrome document, the second background density conversion differing from the first background density conversion.

BRIEF DESCRIPTION OF DRAWINGS

FIGS. 23A and 23B are an example of a density distribution;

FIG. 24 is a block diagram diagrammatically showing an arrangement of a major section of an image processing apparatus according to a sixth embodiment;

BEST MODE OF CARRYING OUT THE INVENTION

The embodiments of the present invention will be explained below with reference to the accompanying drawing.

Figure 1:
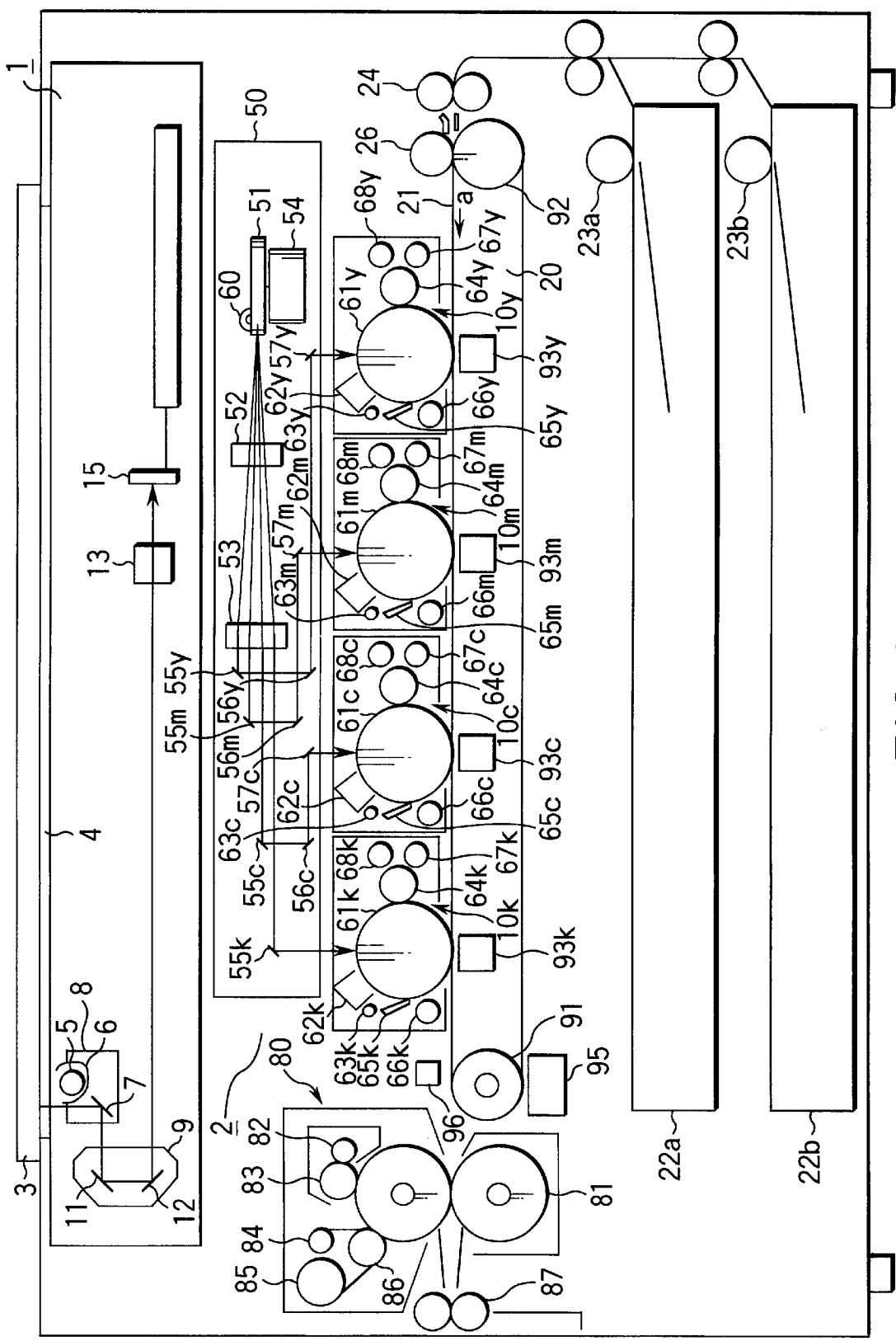
FIG. 1 is a side view diagrammatically showing an inner structure of an image forming apparatus according to an embodiment of the present invention.

FIG. 1 is a view diagrammatically showing an inner arrangement of an image forming apparatus, such as a digital type color copier, which copies an image from a color image in accordance with the present invention. The image forming apparatus is generally separated into a color scanner section 1 as an image reading means for reading out a color image on a document and a 4-tandem type color printer as an image forming means for copying an image from a read-out color image.

The color scanner section 1 has a document glass of transparent glass having a document glass cover 3 thereon, arranged opposite to the document glass cover in a closed state and allowing a document to be set thereon. Below the document glass are arranged an exposure lamp 5 for illuminating the document placed on the document glass 4, a reflector for allowing light which comes from the exposure lamp 5 to be condensed onto the document, a first mirror 7 for allowing the light which is reflected from the document to be bent in a leftward direction relative to the drawing, and so on. The exposure lamp 5, reflector 6 and first mirror 7 are fixed to a first carriage 8. The first carriage 8 is driven by a pulse motor not shown through a toothed belt not shown and, by doing so, moved parallel to, and along the lower surface of, the document glass 4.

On a side to the left of the first carriage 8 in the Figure, that is, in a direction in which the light which is reflected by the first mirror 7 is guided, a second carriage 9 is provided which is movable parallel to the document glass 4 through a drive mechanism (for example, a toothed belt and DC motor, etc.) not shown. In the second carriage 9, a second mirror 11 and third mirror are arranged at a right angle with respect to each other, the second mirror 11 allowing the light from the document which is guided by the first mirror 7 to be bent in a downward direction in the Figure and the third mirror 12 allowing the light from the second mirror 11 to be bent in the right direction in the Figure. The second carriage 9 is driven by the first carriage 8 and moved at a ½ speed along the document glass 4 relative to the first carriage 8.

In a plane including an optical axis of the light reflected by the second and third mirrors 11 and 12, an image formation lens 13 is arranged which allows the light which is reflected from the third mirror 12 to be imaged at a predetermined magnification. In a plane substantially perpendicular to the optical axis of the light passing through the image formation lens 13, a CCD type color image sensor (photoelectric conversion device) 15 is arranged which converts the reflected light which is given a focussing to electric signals.

When the light from the exposure lamp 5 is condensed at a document on the document glass 4 by the reflector 6, the reflected light from the document is incident onto the color image sensor 15 through the first mirror 7, mirror 11, third mirror 12 and color image sensor 15. The color image sensor 15 converts the incident light to the electric signals corresponding to the primary colors R (red), G (green) and B (blue) of light.

A color printer section 2 has first to fourth image forming sections 10y, 10m, 10c and 10k forming those images subjected to color separation for respective color components on the basis of the known subtractive mixture, that is, those images of the four colors yellow (Y), magenta (M), cyan (C) and black (K).

Below the respective image forming sections 10y, 10m, 10c and 10k a conveying mechanism 20 is provided which includes a belt conveyor 21 serving as a conveying means for conveying the images for the respective colors which are formed by the respective image forming sections to be conveyed in a direction of an arrow a. A belt conveyor 21 is stretched between a drive roller 91 rotated in the direction of an arrow a by a motor not shown and a driven roller 92 spaced a predetermined distance from the drive roller 91 and around these rollers 91 and 92 and is endlessly run at a constant speed in the direction of the arrow a. It is to be noted that these image forming sections 10y, 10m, 10c and 10k are arranged in a serial array along the conveying direction of the belt conveyor 21.

The image forming sections 10y, 10m, 10c and 10k include photosensitive drums 61y, 61m, 61c and 61k, respectively, serving as image carriers having outer peripheries and rotatable in the same direction in those positions contacting with the belt conveyor 21.

The respective photosensitive drums 61y, 61m, 61c and 61k are rotated by a motor, not shown, at predetermined peripheral speeds.

The respective photosensitive drums 61y, 61m, 61c and 61k have their axes arranged at an equal interval and arranged in a direction perpendicular to that in which the images are conveyed by the belt conveyor 21. In an explanation as will be set forth, the axial direction of the respective photosensitive drums 61y, 61m, 61c and 61k is referred to as a main scanning direction (second direction) and the rotation direction of the photosensitive drums 61y, 61m, 61c and 61k, that is, the rotation direction (direction of an arrow a in the Figure) of the belt conveyor 21, is referred to as a sub-scanning direction (first direction).

Around the photosensitive drums 61y, 61m, 61c and 61k, chargers 62y, 62m, 62c and 62k serving as a charging means extending in the main scanning direction and serving as a charging means, dischargers 63y, 63m, 63c and 63k, developing rollers 64y, 64m, 64c and 64k serving as developing means similarly extending in the main scanning direction, lower stirring rollers 67y, 67m, 67c and 67k, upper stirring rollers 68y, 68m, 68c and 68k, transfer units 93y, 93m, 93c and 93k serving as transfer means similarly extending in the main scanning direction, cleaning blades 65y, 65m, 65c and 65k similarly extending in the main direction and spent toner recovery screws 66y, 66m, 66c and 66k are sequentially arranged along the rotation direction of the photosensitive drums 61y, 61m, 61c and 61k.

The respective transfer units 93y, 93m, 93c and 93k are arranged relative to the photosensitive drums 61y, 61m, 61c and 61k with the belt conveyor 21 placed therebetween, that is, arranged on an inner side of the belt conveyor 21. The exposure point by a later described exposure device 50 is formed on an outer peripheral surfaces of the photosensitive drums 61y, 61m, 61c and 61k between the chargers 62y, 62m, 62c and 62k and developing rollers 64y, 64m, 64c and 64k, respectively.

Below the conveying mechanism 20, sheet cassettes 22a, 22b are arranged to store a plurality of sheets P as an image forming medium to which images formed by the image forming sections 10y, 10m, 10c and 10k are transferred.

One end sides of the sheet cassettes 22a, 22b and on a side near to a driven roller 92, pickup rollers 23a, 23b are arranged to allow sheets P which are stored in the sheet cassettes 22a, 22b to be picked up one by one from their top. Between the pickup rollers 23a, 23b and the driven roller 92 a register roller 24 is arranged to match the forward end of the sheet P which is picked up from the sheet cassettes 22a, 22b to the forward end of a Y toner image formed on the photosensitive drum 61y of the image forming section 10y.

The toner images formed on the remaining photosensitive drums 61y, 61m and 61c are supplied to the respective transfer positions at a conveying timing of the sheet P conveyed on the conveying belt 21.

Between the register roller 24 and the first image forming section 10y and in the neighborhood of the driven roller 92, that is, on the outer periphery of the driven roller 92 with the belt conveyor 21 substantially sandwiched, an attraction roller 26 is arranged to apply an electrostatic attraction to the sheet P conveyed at a predetermined timing through the register roller 24. The axis of the attraction roller 26 and that of the driven roller 92 are set parallel to be each other.

On one end side of the conveying belt 21 and in the neighborhood of the drive roller 91, that is, on the outer periphery of the drive roller 91 with the belt conveyor 21 substantially sandwiched, a positional displacement sensor 96 is arranged to detect the position of an image formed on the belt conveyor 21. The positional displacement sensor 96 is comprised of a light transmitting or a light reflecting type light sensor.

At the outer periphery of the drive roller 91 and at the belt conveyor 21 on the downstream side of the positional displacement sensor 96 a belt conveyor cleaning device 95 is arranged to remove a toner deposited on the belt conveyor 21 or a paper dust, etc., of a sheet P.

In a direction further conveying the sheet P after the sheet P which is conveyed through the belt conveyor 21 has been released from the drive roller 91, a fixing device 80 is arranged to melt a toner image which is transferred to the sheet P, by heating the sheet P to a predetermined temperature, and fix the toner image to the sheet P. The fixing device 80 comprises a heat roller pair 81, oil coating rollers 82, 83, web wind-up roller 84, web roller 85 and web pressing roller. The toner formed on the sheet P is fixed to the sheet and discharged out of a sheet discharge roller pair 87.

The exposure device 50 forming color-separated electrostatic latent image on the outer peripheral surfaces of the photosensitive drums 61y, 62m, 61c and 61k has a semiconductor layer oscillator 60 subjected to light emission control based on image data (Y, M, C, K) for respective colors which are color-separated by a later described image processing device 36. On an optical path of a semiconductor laser oscillator 60, a polygon mirror 51 rotated by a polygon motor 54 to reflect and scan a laser beam and fθ lenses 52, 53 allowing the focussing of the laser beam which is reflected through the polygon mirror 51 to be corrected and imaged are arranged in a sequential way.

Between the fθ lens 53 and the photosensitive drums 61y, 61m, 61c and 61k, first bending mirrors 55y, 55m, 55c and 55k allowing laser beams of respective colors which pass through the fθ lens 53 to be bent toward the exposure positions of the respective photosensitive drums 61y, 61m, 61c and 61k and second and third bending mirrors 56y, 56m, 56c, 57y, 57m and 57c allowing the laser beams which are bent by the first bending mirrors 55y, 55m, 55c to be further bent are arranged.

The laser beam for black is bent by the first bending mirror 55k and then guided onto the photosensitive drum 61k without passing through other mirrors.

Figure 2:
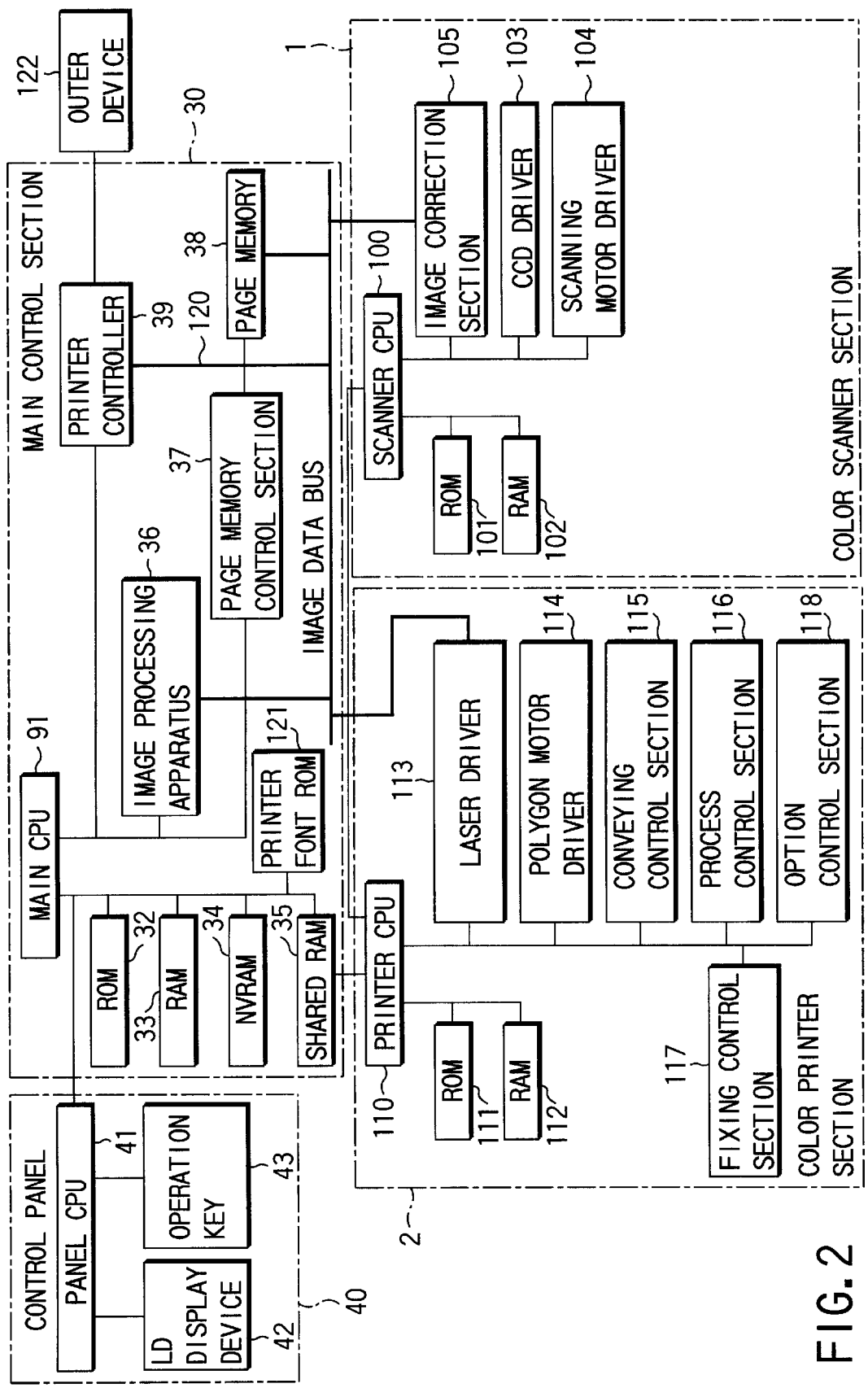
FIG. 2 is a block diagram showing an electrical arrangement of an image forming apparatus shown in FIG. 1.

FIG. 2 is a block diagram schematically showing an electrical connection of the digital copier as shown in FIG. 1 as well as a flow of signals for control. In FIG. 2, a control system comprises a main CPU (central processing unit) 91 in a main control section 30, a scanner CPU 100 in the color scanner section 1 and a printer CUP 110 in the color printer 2.

The main CPU 91 conducts an interactive communication through the printer CPU 110 and sharing RAM (random access memory) 35. The main CPU 91 issues operation instructions and the printer CPU 110 returns a condition status. A serial communication is conducted between the printer CPU 110 and the scanner CPU 100, the printer CPU 110 issues operation instructions and the scanner CPU 100 returns a condition status.

The operation panel 40 has a liquid crystal display 42, various kinds of operation keys 43 and panel CPU 41 connected to these and is connected to the main CPU 91.

The main control section 30 comprises a main CPU 91, ROM (read only memory), 32, RAM 33, NVRAM 34, sharing RAM 35, image processing device 36, page memory control section 37, page memory 38, printer controller 39 and printer font ROM 21.

The main CPU 91 performs general control. The ROM 32 stores a control program, etc. The RAM 33 temporarily stores the data.

NVRAM (nonvolatile random access memory) 34 is comprised of a nonvolatile memory backed up by a battery, not shown and retains memory data even when a power supply is cut off.

The sharing RAM 35 is used to conduct an interactive communication between the main CPU 91 and the printer CPU 110.

The page memory control section 37 enables the page memory 38 to store image information and read out it. The page memory 38 has an area capable of storing image information corresponding to a plurality of pages and is so structured that compressed data of image information from the color scanner section 1 can be stored per page.

The printer font ROM 121 stores font data corresponding to the print data. The printer controller 39 enables the print data from an external device 122, such as a personal computer, to be developed to image data with a resolution corresponding to data representing a resolution imparted to the print data and to do so with the use of font data stored in the printer font ROM 121.

The color scanner section 1 comprises the scanner CPU 100 for performing general control, ROM 101 storing control program, etc., RAM 102 for data storage, CCD driver 103 driving the color image sensor 15, scanning motor driver 104 controlling the rotation of the scanning motor for moving the first carriage 8, etc., and image correction section 105.

The image correction section 105 comprises an A/D conversion circuit converting R, G and B analog signals which are output from the color image sensor 15 to respective digital signals, shading correction circuit correcting a variation of a threshold level against an output signal from the color image sensor 15 caused by a variation of the color image sensor 15 or by a surrounding temperature variation, etc., line memory once storing a shading-corrected digital signal from the shading correction circuit, and so on.

The color printer section 2 comprises the printer CPU 110 performing general control, ROM 111 storing a control program, etc., RAM 112 for data storage, laser driver 113 driving the semiconductor laser oscillator 60, polygon motor driver 114 driving the polygon motor 54 of the exposure device 50, conveyance control section 115 controlling the conveying of the sheet P by the conveying mechanism 20, process control section 116 controlling the charging, developing and transfer processes by the use of the charger, developing roller and transfer device, fixing control section 117 controlling the fixing device 80, option control section 118 controlling options, and so on.

The image processing device 36, page memory 38, printer controller 39, image correction section 105 and laser driver 113 are connected by an image data bus 120.

Figure 3A:
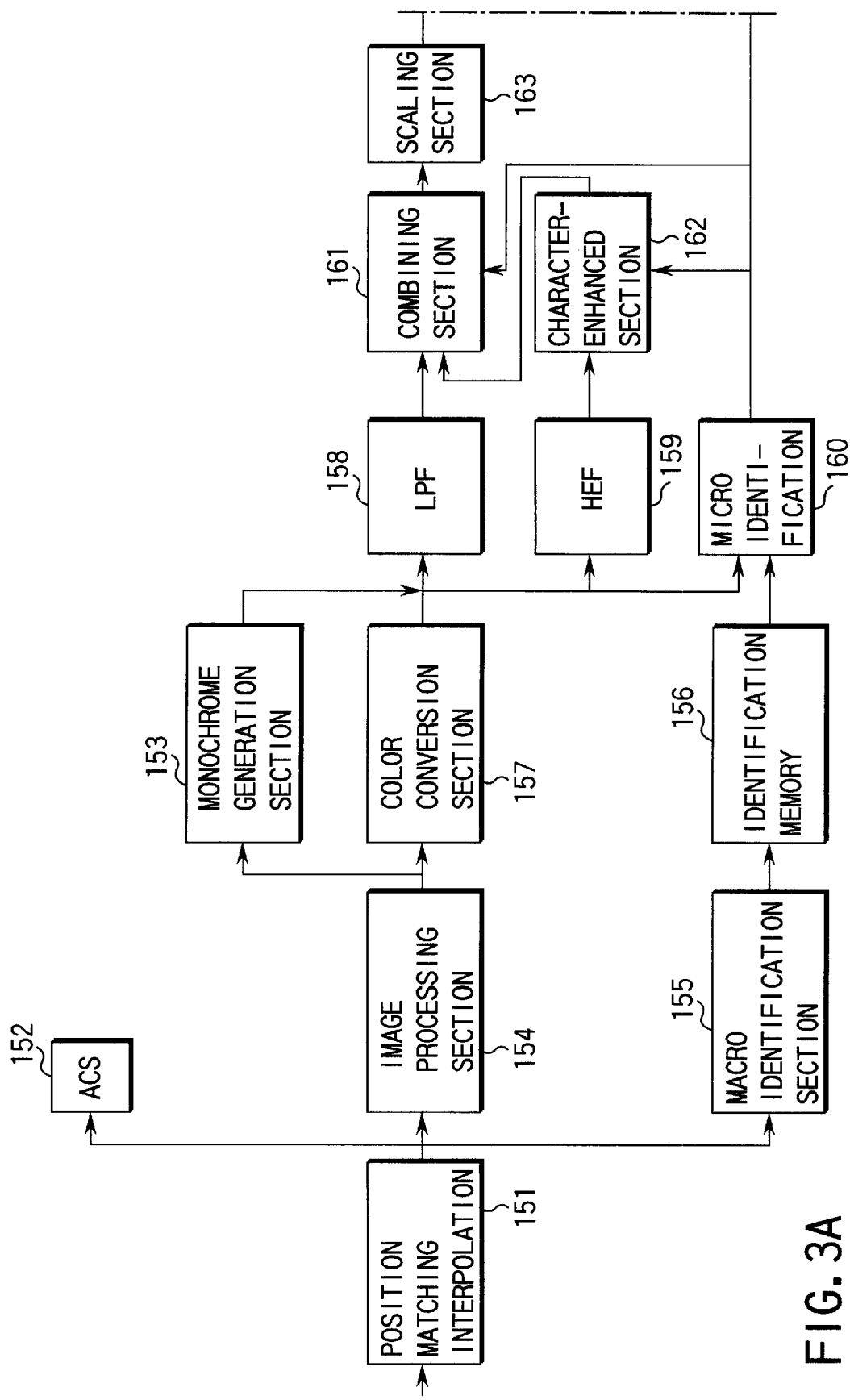
FIGS. 3A and 3B are a block diagram showing a major section of an image processing apparatus according to a first embodiment of the present invention.
Figure 3B:
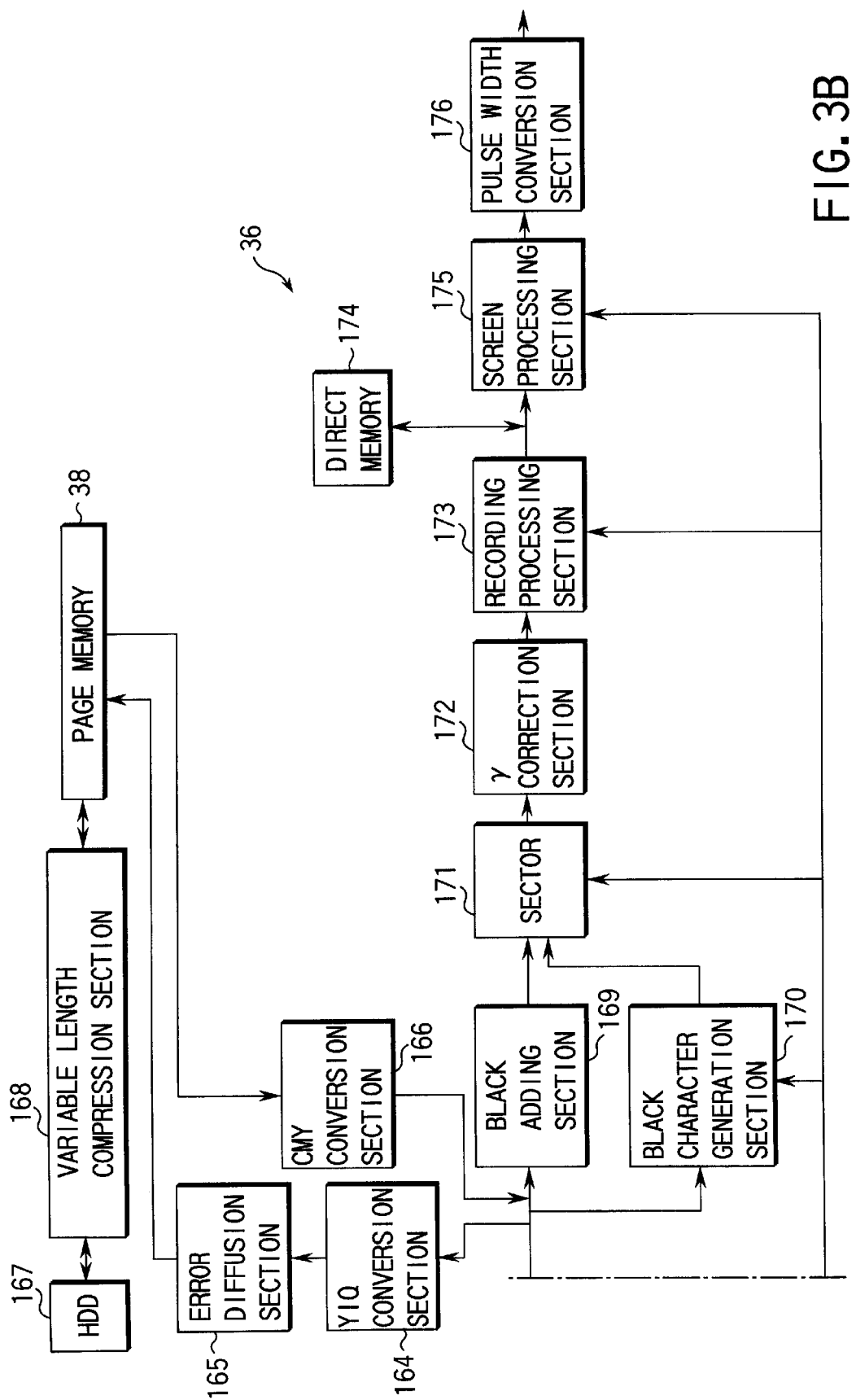

FIG. 3 schematically shows an arrangement of an image processing device 36. In FIG. 3, color image data R, G, B output from the color scanner section 1 are sent to a position matching interpolation section 151 where a position matching interpolation is performed on the color image data R, G, B. That is, in general, in the case of the enlarging and scaling of the image read from the document, digital processing is performed on the image read out in the main scanning direction and the moving speed of the scanner carriage is varied with respect to the image read out in the sub-scanning direction. In the case where a RGB three line CCD sensor (8 line pitch) is used as a color image sensor 15, there occurs no problem at a 100%/integral multiple magnification. In other magnifications, a positional displacement occurs, in the sub-scanning direction, among the R, G, B. The position matching interpolation section 151 interpolates pixel values on the basis of this displacement amount and, by doing so, corrects the positional displacement.

The color image data R, G, B output from the positional matching interpolation section 151 are sent to an ACS 152, monochrome generation section 153, image processing section 154 and macro identification section 155.

The ACS 152 identifies whether the read-out document is a color document or a monochrome document. It makes their decision at a prescan time and switching is made, at a main scan time, to either of color processing and monochrome processing.

The monochrome generation section 153 generates a monochrome image data from the R, G, B color image data at a monochrome copying mode time. The image processing section 154 performs background tone elimination processing on a document having a background tone as will be set forth below.

The macro identification section 155 identifies a photograph area and character area in the read-out document. That is, it makes a global decision based on a run image input to the page memory through the prescanning of the document. A result of the decision by the macro identification section 155 is once stored in the identification memory 156 and, at the main scanning time, output to the macro identification section 160.

The output of the image processing section 154 is sent to the color conversion section 157. The input signals from the color scanner section 1 are those of the R, G, B and the signals at the color printer section 2 are those of C, M, Y, K. It is, therefore, necessary to effect the conversion of the color signals. At the color conversion section 157, the image data of R, G, B are converted to the image data of C, M, Y. A color adjustment can also be effected, as the user likes, by converting color conversion parameters.

The outputs (color image data C, M, Y) of the color conversion section 157 are sent to a lowpass filter (LPF) 158, highpass enhanced filter (HEF) 159 and micro identification section 160.

The lowpass filter 158 and highpass enhanced filter 159 perform spatial filter processing, such as the noise elimination, moire elimination, edge enhancement, etc. The output of the lowpass filter 158 is sent to a combining section 161 and the output of the highpass enhanced filter 159 is sent to a character enhancing section 162.

The micro identification section 160 decides a photograph area and character area in the document. Here, the decision is made with reference to a local area of about 3×3 pixels for example. Based on a result of this decision it is possible to switch respective processes of the combining section 161, character enhancing section 162, black adding section 169, black character generation section 170, selector 171, record processing section 173 and screen processing section 175.

The character enhancing section 162 performs the character portion enhancing processing and a result of this processing is sent to the combining section 161. The combining section 161 combines the output of the lowpass filter 158 and that of the character enhancing section 162 and a result of this combination is sent to a scaling section 163. The scaling section 163 performs enlarge/reduce processing in the main scanning direction.

In rotate processing of an electronic source and image, etc., for example, the image data is once stored in the page memory 38 and the respective processing section performs the respective processing by reading out a portion necessary to an object of processing from the page memory 38 as the occasion arises. It is, therefore, necessary to read out any area of the image at a given rate. In the case where the image data is stored in the page memory 38, first a YIQ conversion section 164 and error diffusion section 165 perform compress/expand processing at a fixed length.

In the YIQ conversion section 164, the image data of C, M, Y are converted to Y, I, Q data and the redundancy of color components is eliminated and, in the error diffusion section 165, bit reduction is effected while reserving the gradation by the error diffusion. At the time of reading out compressed image data from the page memory 38, the expansion of the image data and conversion of the Y, I, Q data to the C, M, Y data are carried out in the CMY converter 166.

At the operation time of the electronic sorting function in which the page memory 38 alone is not adequate for its capacity, the image data is designed to be stored in the hard disc device (HDD) 167. At that time, the access speed to the hard disc device 167 is limited and variable length compress-processing of as good a compression efficiency as possible is carried out in the variable length compression section 168.

The output of the scaling section 163 is sent to the black adding section 169 and black character generation section 170 and the black adding section 169 generates a black signal K from the image data C, M, Y and the black adding processing for adding the black signal K to the image data C, M, Y is carried out.

The black character generation section 170 additively overlaps the image data C, M, Y with one another and generates a black signal K. However, the black character becomes higher in image quality in terms of the color and resolution property by making recording with one black color than by making recording with the image data C, M, Y overlapped with one another. Therefore, the selector 171 switches the output of the black adding section 169 and output of the black character generation section 170 to an identification signal which is output from the micro identification section 160 and is output to a γ correction section 172.

The γ correction section 172 corrects the γ character of the printer section 2. At the time of making this correction, reference is made to γ tables set for each of the image data C, M, Y, K.

The output of the γ correction section 172 is sent to the record processing section 173. The record processing section 173 performs gradation processing, such as error diffusion, etc., and the image data of the input 8 bits is converted to data of about 4 bits without impairing the gradation tone.

For the 4-tandem type image forming apparatus for example, the phases with which the four color image signals are recorded are different from one another and, at a direct memory 174, delays corresponding to the respective phases are given to the respective image signals.

For the 4-tandem type image forming apparatus, even if the image signals of the respective colors are similarly output with the laser beam optical system, a moire and color error are generated due to a slight skew of each color, magnification error, etc. In the screen processing section 175, therefore, with respect to the output of the recording processing section 173, an angle is set to the screen of the respective color, thus suppressing the generation of the moire and color error.

The output of the screen processing section 175 is supplied to a pulse width conversion section 176. Since the signal levels subjected by the respective sections to image processing and recording density are not linear, the pulse width conversion section 176 controls the pulse drive time of the laser modulation section in the printer section 2 and effect the pulse width conversion so as to obtain a linear characteristic. The output of the pulse width conversion section is sent to the printer section 2.

Figure 4:
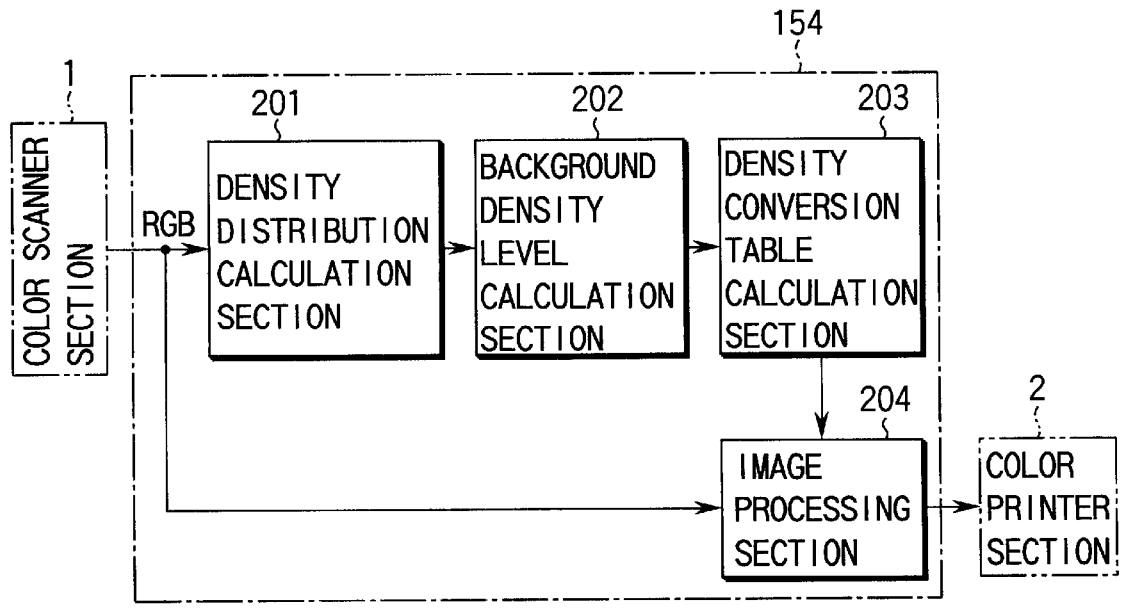
FIG. 4 is a block diagram showing an arrangement of a major section of an image processing apparatus according to a first embodiment.

FIG. 4 shows an arrangement of a major section of an image processing apparatus according to a first embodiment of the present invention. For brevity in an explanation in FIG. 4 et seq., those other than the image processing section 154 are omitted in illustration and will be explained below in this context.

In FIG. 4, the color image data, R, G, B output from the color scanner section 1 is sent to a density distribution calculation section 201 through the position matching interpolation section 151. The density distribution calculation section 201 calculates a density distribution of the color of the document as color features of the document on the basis of the input color image data R, G, B and a result of calculation is sent to a background density level calculation section 202. The background density level calculation section 202 calculates the background density level of the document on the basis of the density distribution calculated at the density distribution calculation section 201 and sends a result of calculation to a density conversion table preparing section 203. The density conversion table preparing section 203 prepares, on the basis of the underground density level calculated at the underground density level calculation section 202, a density conversion table for use at the time of conversion at the image conversion section 204. The image conversion section 204 converts the image density of the input color image data R, G, B on the basis of the density conversion table prepared at the density conversion table preparing section 203.

The respective sections will be explained in more detail below.

First, an explanation will be given below about the density distribution calculation section 201. The density distribution calculation section 201 calculates the density distribution of the color of the document and is constituted by a histogram extracting means comprising a multi-value obtaining section 181 serving as a multi-value obtaining means as shown in FIG. 5 and a histogram preparing section 182 serving as a histogram preparing means as shown in FIG. 6.

The multi-value obtaining section 181 applies multi-value obtaining processing to the input image data R, G, B by comparison with predetermined threshold values Th1 to Thn−1 and outputs multi-value image signals Rg, Gg, Bg. As shown in FIG. 5, it comprises a threshold value memory 183 storing an n−1 number of threshold values Th1 to Thn−1, an n−1 number of comparators $184_1$ to $184_{n-1}$ comparing the input image data R (G, B) with the threshold values Th1 to Thn−1, and encoder 185 encoding a result of comparisons of the comparators $184_1$ to $184_{n-1}$.

Figure 5:
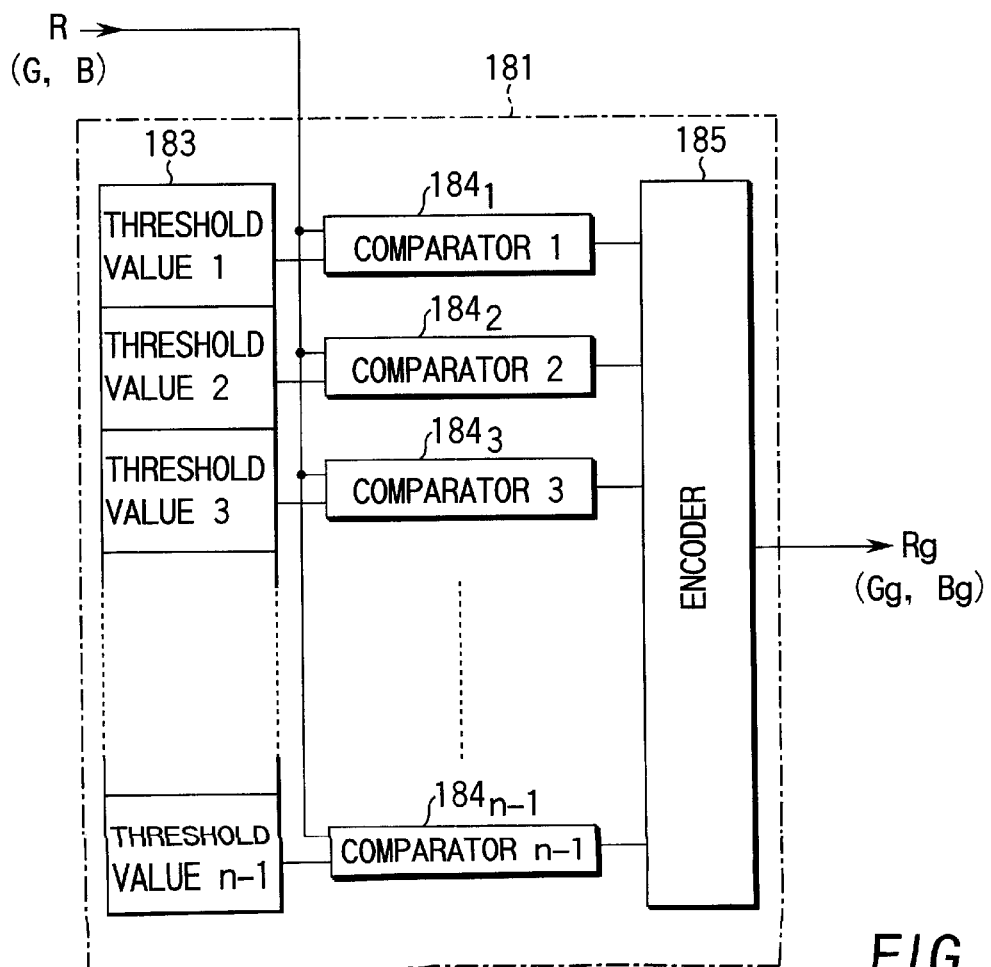
FIG. 5 is a block diagram showing an arrangement of a multi-value obtaining section in an impurity distribution calculation section.
Figure 6:
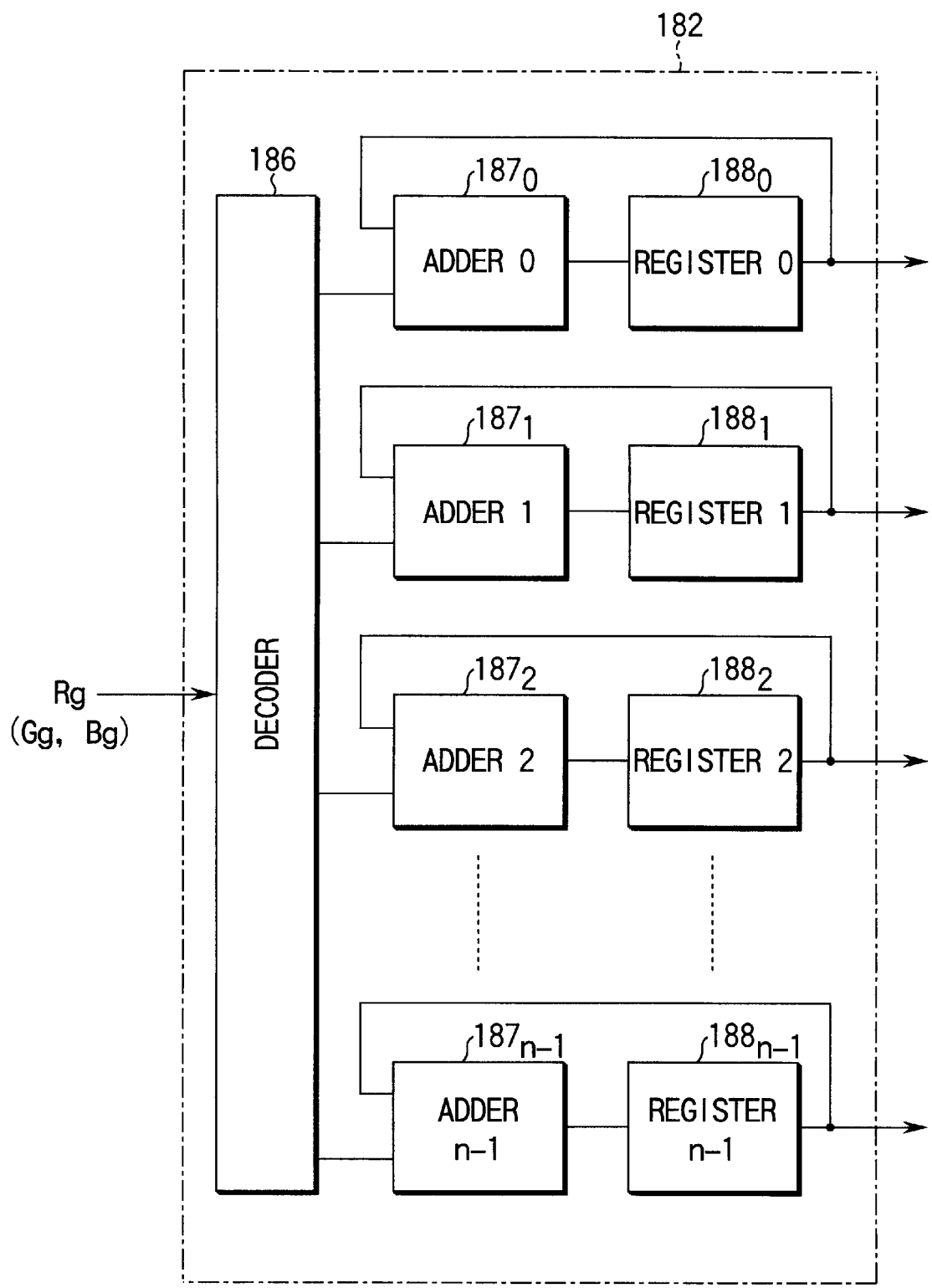
FIG. 6 is a block diagram showing an arrangement of a histogram preparing section in a density distribution calculation section.

Although, in FIG. 5, only a circuit for the image data R is shown, a similar circuit is also provided for the image data G, B in actual practice and their illustration is omitted.

Here, the operation of the multi-value obtaining circuit 181 will be explained below with the number of the multi-valued levels given by n. First, the input image data R (values 0–0255) are compared by the comparators $184_1$ to $184_{n-1}$ with the threshold values Th1 to $Th_{n-1}$ in the threshold memory 183. The respective comparator generates an output "0" when the input image data is smaller than the threshold value and an output "1" when otherwise. The encoder 185 converts a result of comparisons to a multi-valued version and outputs an image signal Rg. As a result, the multi-value obtaining section converts the input image data R to a multi-valued version as given below and outputs a multi-valued image signal Rg.

$Rg=0:R<Th1$ $Rg=1:R \geq Th1$ and $R<Th2$ $Rg=2:R \geq Th2$ and $R<Th3$ $Rg=3:R \geq Th3$ and $R<Th4$ $Rg=n-2:R \geq Thn-2$ and $R<Thn-1$ $Rg=n-1:R \geq Thn-1$ (1)

Regarding the image data G, B, a similar calculation is made in the same way as set out in connection with the image data R and multi-valued image signals Gg, Bg are calculated.

The histogram preparing section 182 prepares a histogram information on the basis of the multi-valued image signals Rg, Gg, Bg output from the multi-value obtaining section 181. The histogram preparing section 182 comprises, as shown in FIG. 6, a decoder 186 decoding the input multi-valued image signal Rg (Gg, Bg), n number of adders $187_0$, $187_1$, ... $187_{n-1}$ and n-number of registers $188_0$, $188_1$, ... $188_{n-1}$.

Although, in FIG. 6, only the circuit for the multi-valued image signal Rg is shown, a similar circuit is also provided for the multi-valued image signals Gg, Bg in actual practice and their illustration is omitted.

Here, the operation of the histogram preparing section 182 will be explained below. In the case where the registers $188_0$ to $188_{n-1}$ receiver an image of A3 size and 400 dpi for example, 25 bits are necessary. The respective registers $188_0$. . . $188_{n-1}$ are all cleared initially to [0]. If the multi-valued image signal Rg is [0], [1] is added to the adder $187_0$. The register $188_0$ retains the output of the adder $187_0$ and outputs it to the adder $187_0$. That is, the adder $187_0$ adds together the output of the register $188_0$ and that of the decoder 186.

If the multi-valued image signal Rg is "1", then "1" is added to the adder $187_1$ and, if the multi-valued image signal Rg is "2", then "1" is added to the adder $187_1$. As a result, histogram information is prepared in the registers $188_0$. . . $188_{n-1}$. These processes are done independently on the multi-valued image signals Rg, Gg and Bg.

The process is repeatedly done for the sequentially input pixel and repeatedly done until the image inputting of one page is finished. Hereinbelow, the respective frequency (histogram information) of those information items cumulated from the register $188_0$ (low density portion) to the register $188_{n-1}$ (high density portion) will be explained below as RH(0), RH(1), . . . , RH(n−1) for the image data R and as GH(0), GH(1), . . . , G(n−1) and BH(0), BH(1), . . . , BH(n−1) for the image data G and B.

Figure 7A:
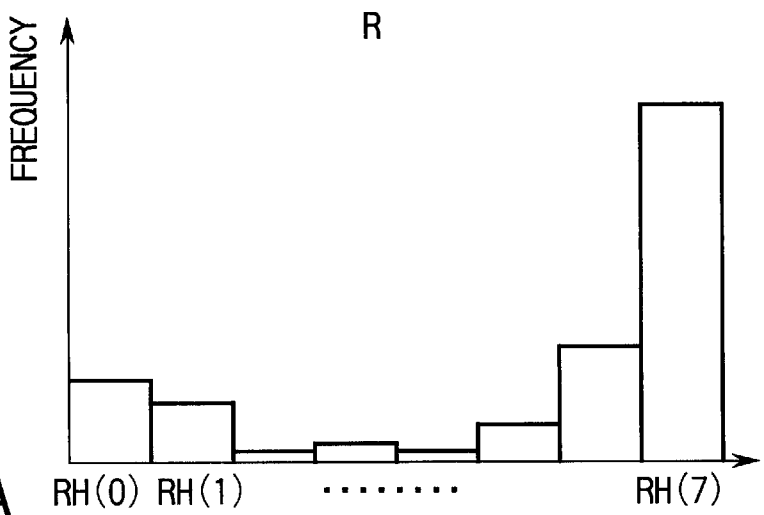
FIGS. 7A to 7C show an example of a histogram.
Figure 7B:
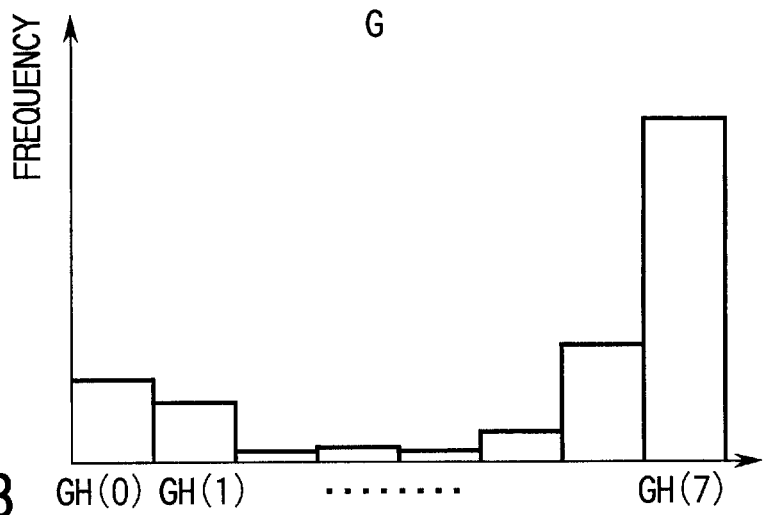
Figure 7C:
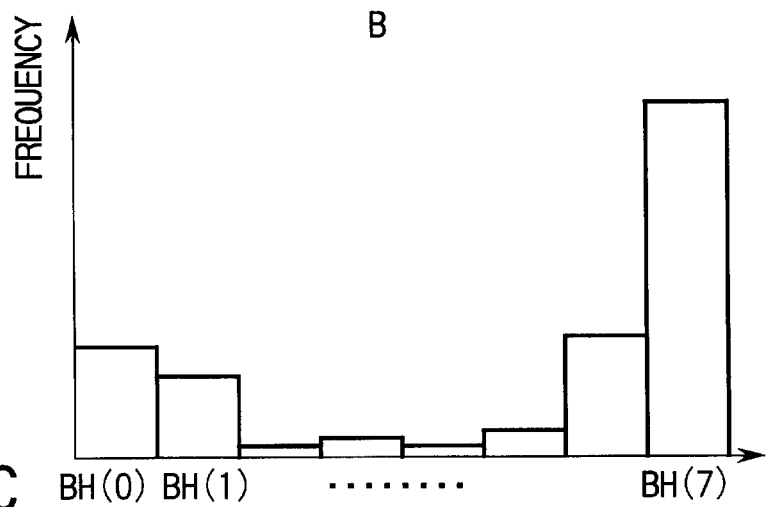

The histogram preparing section 182 produces histograms as shown in FIG. 7. FIG. 7 is a typical example (n=8) of a monochrome document and RH, GH, BH reveal substantially similar frequencies and have greater frequencies at the respective high density portion and low density portion.

The extraction of color features is found based on the mutual values of R, G, B (that is, not independently of R, G, B) and it is necessary to have a large quantity of registers as given below:

$g=0:R<Th1$ and $G<Th1$ and $B<Th1$ $g=1:R>Th1$ and $R<Th2$ and $G<Th1$ and $B<Th1$ $g=n:R<Th1$ and $G<Th1$ and $G<th2$ and $B<Th2$ $g=n^3-1:R \geq Thn-1$ and $G \geq Thn-1$ and $B \geq Thn-1$ \hfill (2)

That is, it is necessary to have an $n^3$ number of registers.

In this embodiment, on the other hand, histogram information is found, by a density distribution calculation section 201, for the image data R, G, B and, by doing so, it is possible to extract the color features satisfying the usage of the present invention and to largely reduce memories involved. It is only necessary to have a n×3 number of registers for the present embodiment.

Next, an explanation will be given below about background density level calculation section 202. The background density level calculation section 202 calculates a background density level (or the level of each color) of the read-out document on the basis of the density distribution information calculated by the density distribution calculation section 201.

Figure 8:
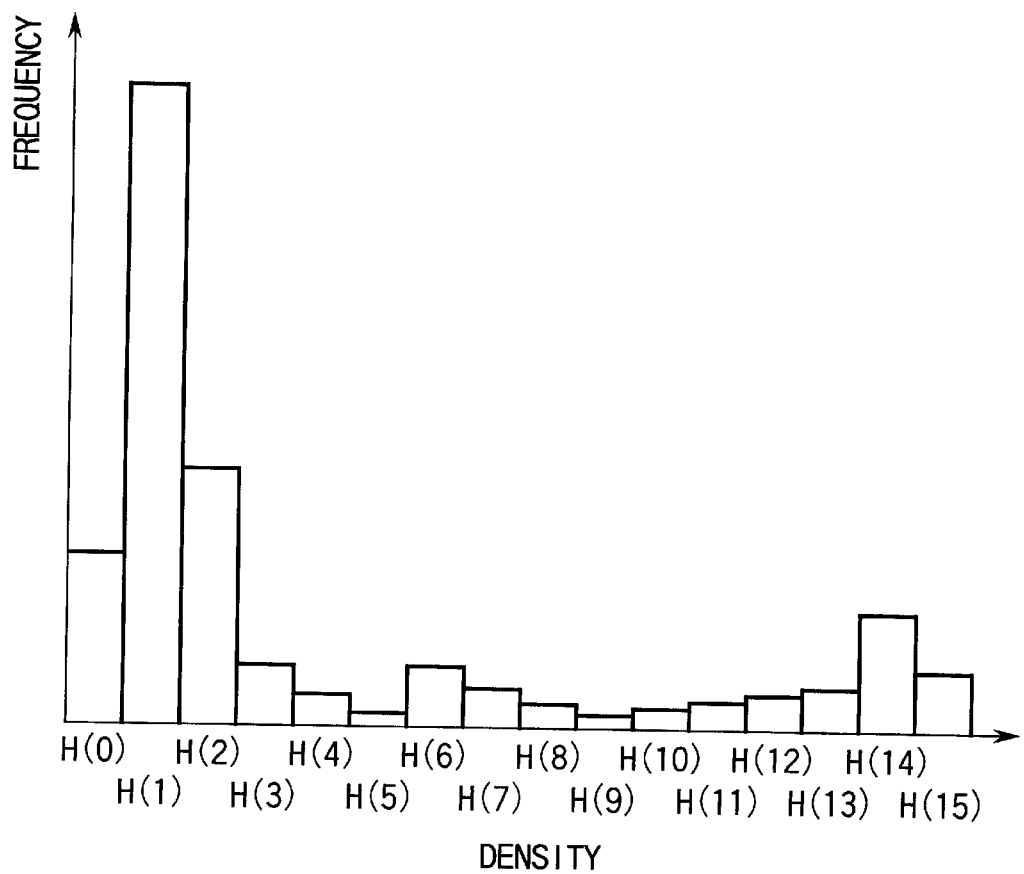
FIG. 8 is a view showing an example of a histogram.

Hereinbelow, the background density level calculation section 202 will be explained below with the use of an example of reading out a monochrome document of FIG. 8 in a monochrome mode. In the example as shown in FIG. 8, the abscissa denotes the density and the ordinate the frequency. That is, the low density level corresponding to the background is located to the left and the high density level corresponding to the character to the right. The background density level calculation section 202 decides a background density level by a deciding equation as given below.

$H\mathrm{max}=\mathrm{max}(H(0), H(1), \ldots, H(B\mathrm{max}))$ \hfill (3)

$BL$: a density level having an $H$max value \hfill (4)

Here

Hmax: a maximum density distribution value;

BL: a calculated background density level; and

Bmax: a range of a background area

That is, as indicated by the equation (3), the maximum density distribution value Hmax is found in a range of Bmax from the density ⌈0⌋ and, as indicated by the equation (4), the density level of the maximum density distribution value Hmax is the background density level BL. In the example shown in FIG. 8, the density distribution value H(1) is maximal and the density level at that time, that is, the calculated background density level BL is ⌈1⌋.

Figure 9:
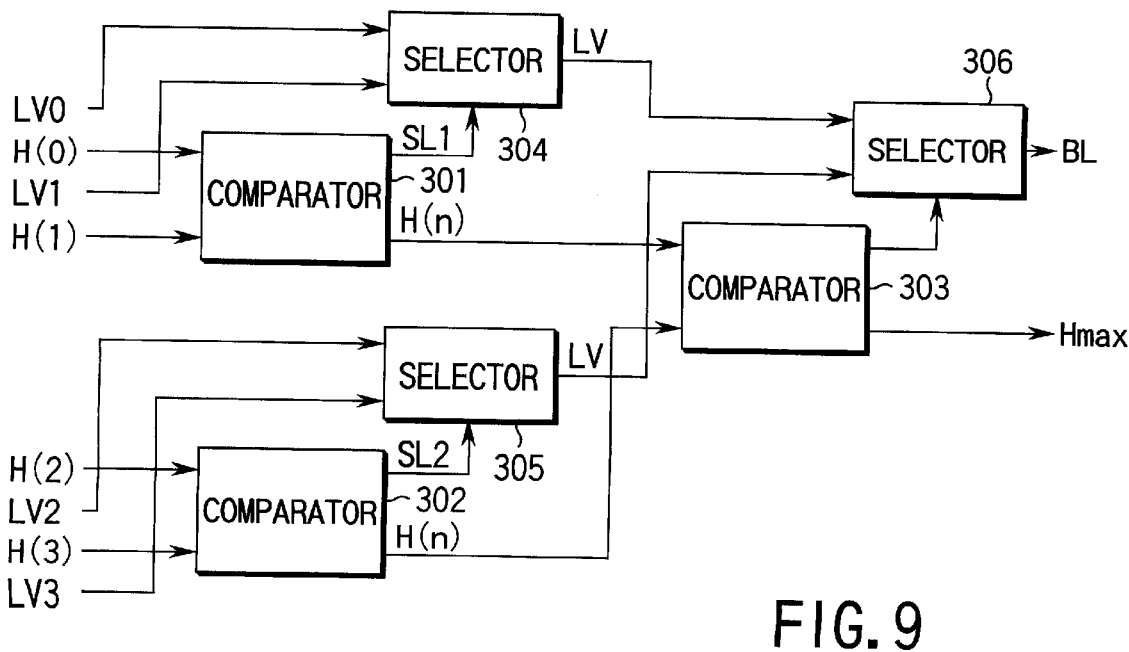
FIG. 9 is a block diagram showing an arrangement of a background density level calculation section.

FIG. 9 is one practical form of a circuit implemented with the background density level calculation section as a hardware and it comprises three comparators 301, 302 and 303 and three selectors 304, 305 and 306. This is an example of Bmax=3.

The comparator 301 receives a density distribution values H(0) and H(1) and outputs a greater value H(n) and greater select signal SL1. The selector 304 receives the density levels LV0, LV1 of density distribution values (0) and H(1) and a greater density level of the density distribution value is selected and output by a select signal SL1 output from the comparator 301. In the example of the density distribution of FIG. 8, the H(1) as the density distribution value is output as a density level.

The comparator 302 and selector 305 operate in a similar fashion and, in the example shown in FIG. 8 H(2) and ⌈2⌋ are output as the density distribution value and density value, respectively. The comparator 303 and selector 306 receive the outputs of the comparators 301, 302 and outputs of selectors 304, 305, respectively, and receive the outputs of the selectors 304, 305 and operate similarly to the comparators 301, 302 and selectors 304, 305. In the example of FIG. 8, the H(1) and ⌈1⌋ are output as a maximum density distribution value Hmax and background density level BL, respectively.

Next, an explanation will be given below about the density conversion table preparing section 203. The density conversion table preparing section 203 prepares a density conversion table on the basis of a background density level prepared by the background density level calculation section 202.

Figure 10A:
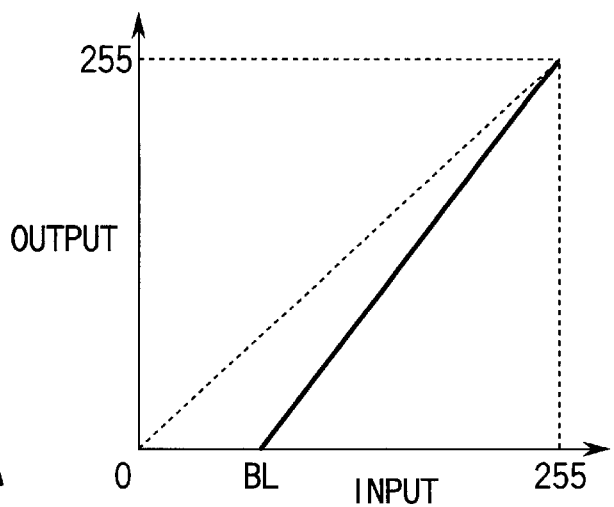
FIGS. 10A and 10B show one example of a density conversion table.
Figure 10B:
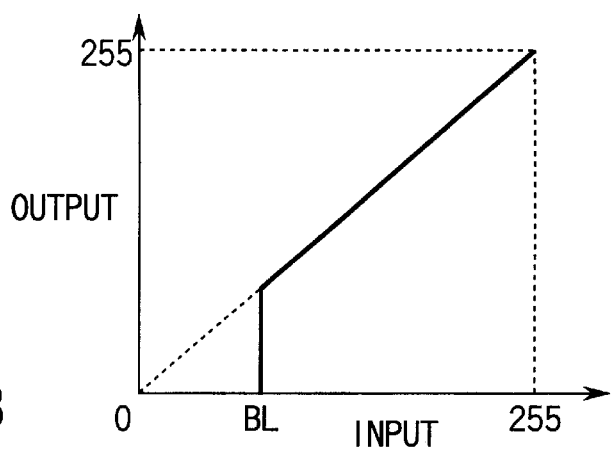

FIGS. 10A and 10B are one example of the density conversion table. A table (256 byte; 356×3 bytes for a color RGB) for converting an input signal of 8 bits (256 levels) is prepared based on the background density level BL calculated by the background density level calculation section 202.

For the case of FIG. 10A, an output Do is ⌈0⌋ in the case where the input density level Di is below the background density level BL and Do=Dix(255−BL)/255 in the case where the input density level Di is above the background density level BL. Here, a 16-step background density level BL calculated by the background density level calculation section 202 is converted to one of 256-step density levels as will be set out below.

For the case of FIG. 10B, the output Do is ⌈0⌋ in the case where the input density level Di is below the ⌈BL⌋ and Do=Di in the case where the input density level Di is above the background density level BL. In either case, the output density level is ⌈0⌋ in the case where the input density level Di is below the background density level BL and it is possible to remove the background level.

Next, an explanation will be given below about the image conversion section 204. The image conversion section 204 converts the image density on the basis of the density conversion table prepared by the density conversion table preparing section 203. The image conversion section 204 is comprised of a RAM (256×3 bytes for the color RGB case) of, for example, 8 bits×56=256 bytes. It is possible to obtain an output image density by reading out the contents of the RAM with the input image density as an address.

By the above-mentioned arrangement it is possible to remove the background density.

Next an explanation will be given about the second embodiment.

In the first embodiment, the background density level is calculated while, on the other hand, the background density level is calculated in the second embodiment taking into consideration the broadening of the background density distribution.

Figure 11:
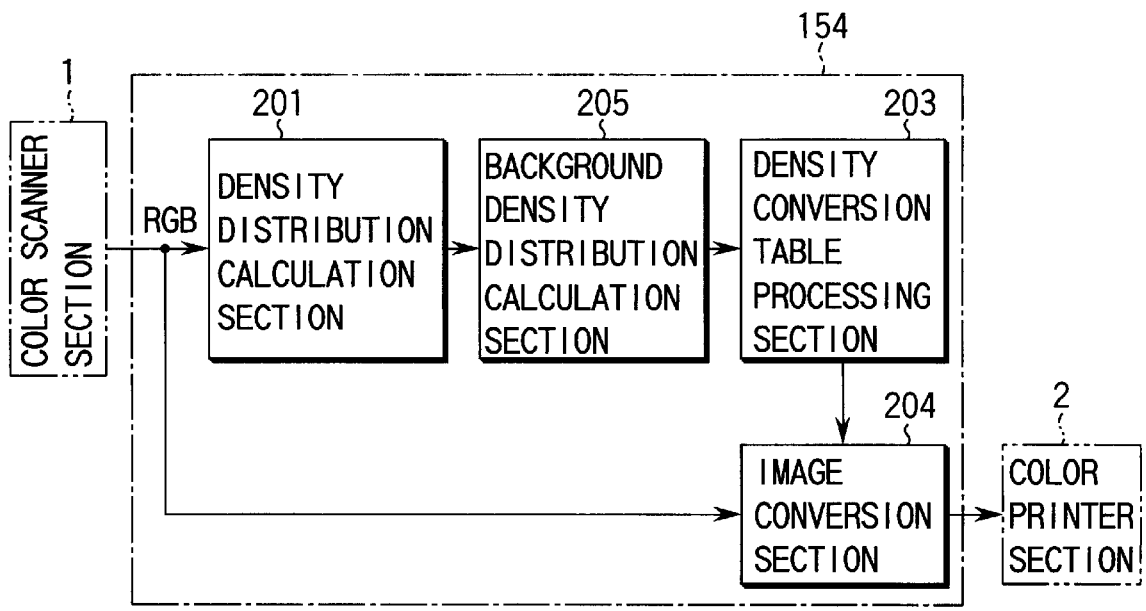
FIG. 11 is a block diagram showing an arrangement of a major section of an image processing apparatus according to a second embodiment.

FIG. 11 shows an arrangement of a major portion of an image processing apparatus 36 according to the second embodiment. The second embodiment is different from the first embodiment in that, in place of the background density level calculation section 202, use is made of a background density distribution calculation section 205. The other portion of the second embodiment is the same as that of the first embodiment and any further explanation is omitted with the same reference numerals employed to designate part and element corresponding to those shown in the first embodiment.

Figure 12:
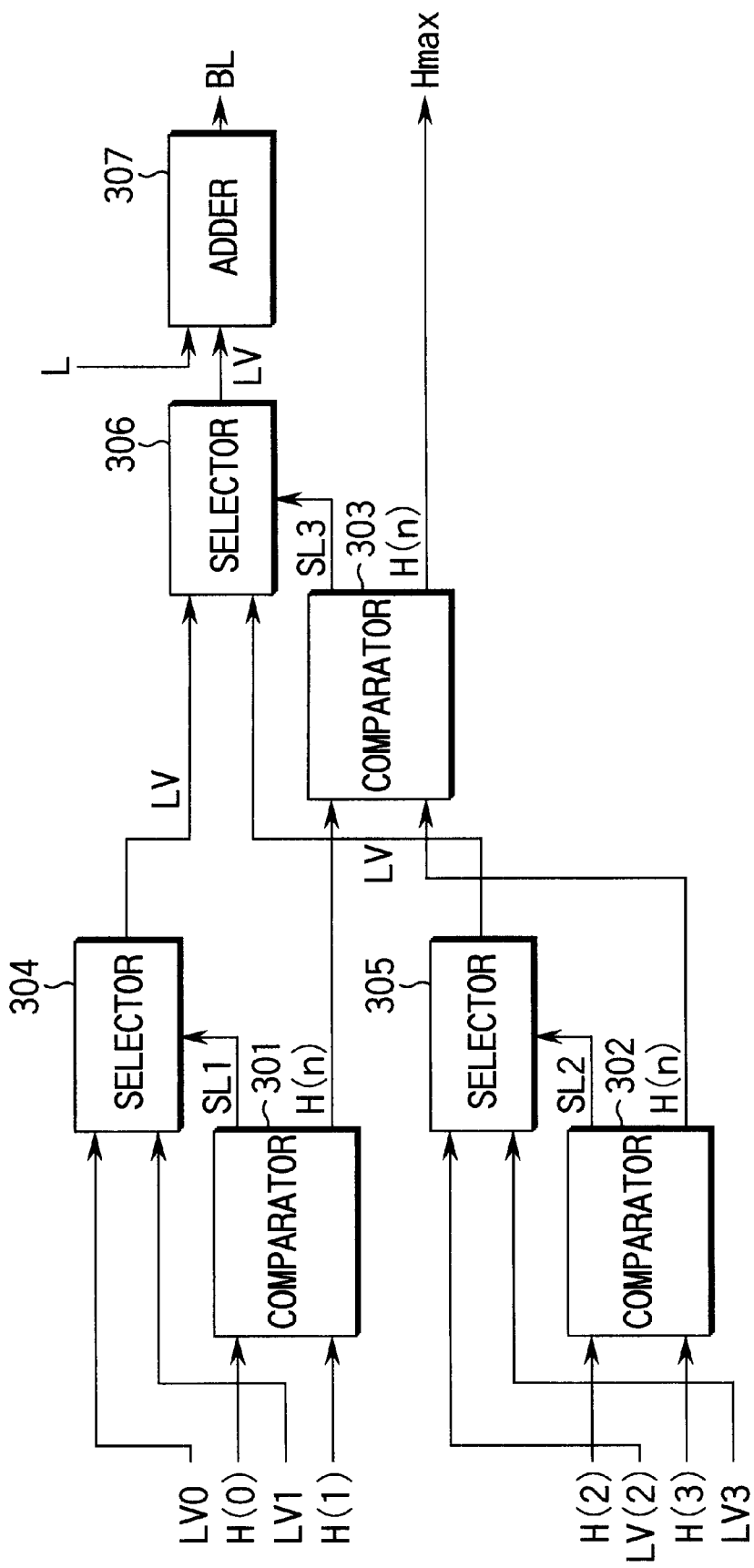
FIG. 12 is a block diagram showing an arrangement of a background density distribution calculation section.

FIG. 12 shows a practical form of the background density distribution calculation section 205 and it comprises three comparators 301, 302, 303, three selectors 304, 305 and 306 and adder 307.

The comparator 301 receives density distribution values H(0) and H(1) and outputs a greater H(n) value and greater select signal SL1. The selector 304 receives the density levels LV0, LV1 of the density distribution values H(0) and H(1) and selects and outputs a density level of a greater density value by a select signal SL1 output from the comparator 301. In the example of the density distribution of FIG. 8, H(1) as a density distribution value is output as a density distribution value.

The comparator 302 and selector 305 operate in the same manner and, for the case of FIG. 8, H(2) and ⌈2⌋ are output as a density distribution value and density level, respectively. The comparator 303 and selector 306 receive the respective outputs of the comparators 301, 302 and respective outputs of selectors 304, 305. The comparators 301, 302 and selectors 304, 305 operate in a similar fashion.

The adder 307 adds a predetermined level to the output of the selector 306. In the case of FIG. 8, at L=1, H(1) and ⌈2⌋ are output as a maximum density distribution value Hmax and background density level BL, respectively.

By the above-mentioned arrangement, it is possible to better remove the background level even in the case where the background density is uneven to some extent.

Then, a third embodiment will be explained below.

In the above-mentioned first and second embodiments, the image density is converted based on the density conversion table while, in a third embodiment, this is done through calculations all with the use of hardware.

Figure 13:
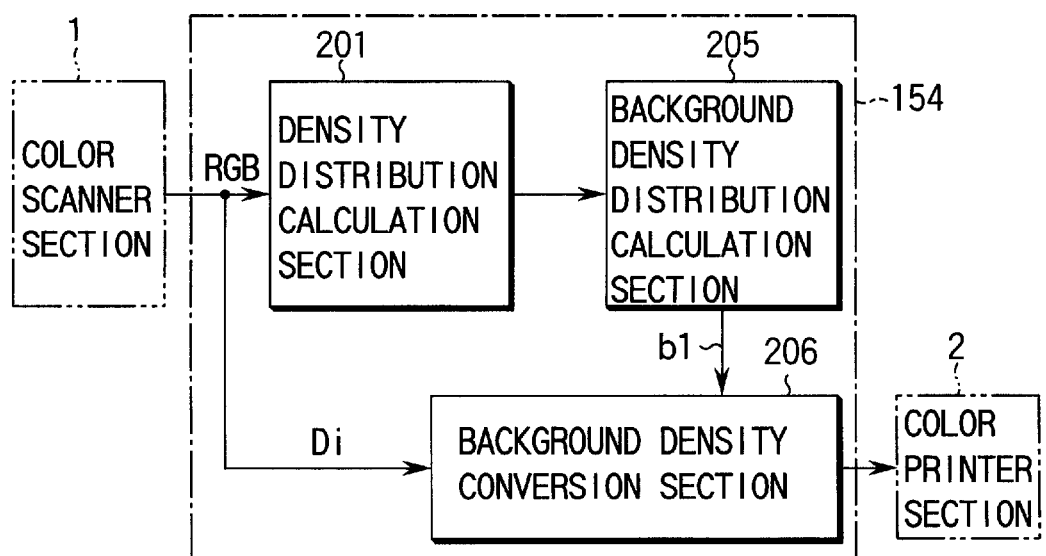
FIG. 13 is a block diagram showing an arrangement of a major section of an image processing apparatus according to a third embodiment.

FIG. 13 is an arrangement of a major portion of an image processing apparatus 36 according to a third embodiment. The third embodiment is different from the second embodiment in that the density conversion table preparing section 203 is eliminated and that, instead of the image conversion section 204, a background density conversion section 206 is used. The remaining portion is the same as that of the second embodiment and the same reference numerals are employed to designate parts or elements corresponding to those shown in the second embodiment and any further explanation is omitted.

Figure 14A:
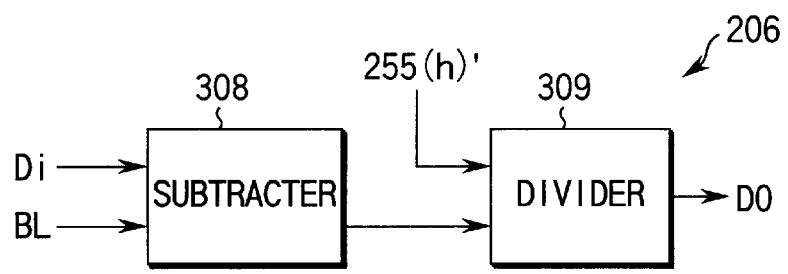
FIGS. 14A and 14B are a block diagram showing an arrangement of a background density conversion section.
Figure 14B:
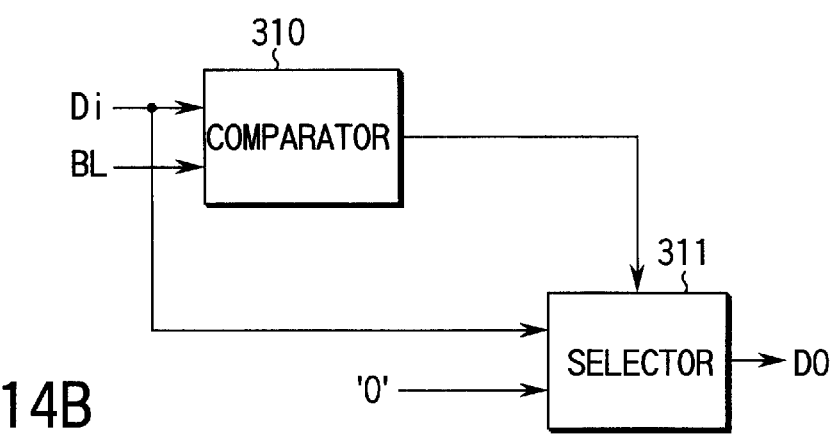

FIGS. 14A and 14B show a practical form of the background density conversion section 206. In the case of FIG. 14A, it comprises a subtracter 308 for effecting subtraction between an input density level Di and a background density level BL and subtracter 309 for effecting subtraction between the output of the subtracter 308 and a predetermined value ⌈255⌋. It follows that:

input density level $Di$<background density level $BL$: output level $Do=0$ input density level $Di \geq$ background density level $BL$: output level $Do=Di \times (256-BL)/255$ \hfill (5)

In the case of FIG. 14B, the practical form comprises a comparator 310 for comparing the input density level Di and background density level BL and selector 311 for selecting either one of the input density level Di or predetermined value ⌈0⌋ by a result of comparison of the comparator 310. It follows that:

input density level $Di$<background density level $BL$: output level $Do=0$ input density level $Di \geq$ background density level $BL$: output level $Do=Di$ \hfill (6)

Next an explanation will be given about a fourth embodiment.

The fourth embodiment is such that, in the case of a color document of a color background, it is effective to suppress an uneven shade of density and "back page" emergence, not eliminate the background tone.

Figure 15:
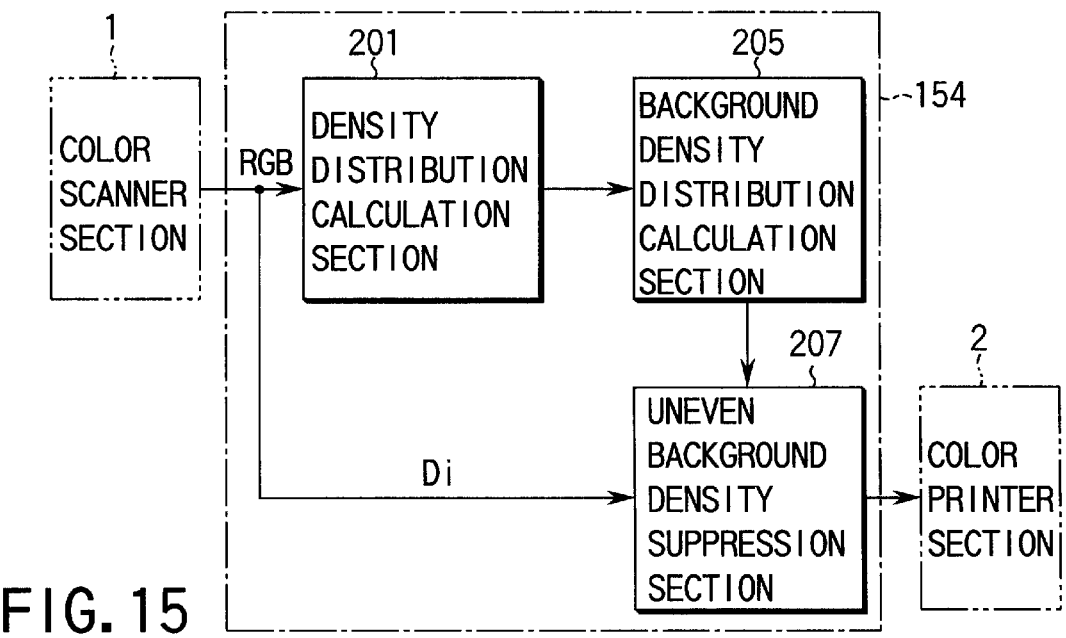
FIG. 15 is a block diagram showing an arrangement of a major section of an image processing apparatus according to a fourth embodiment.

FIG. 15 diagrammatically shows an arrangement of a major part of an image processing apparatus according to the fourth embodiment. The fourth embodiment is different from the third embodiment in that an uneven background density suppression section 207 is used instead of the background density conversion section 206. The remaining portion of the fourth embodiment is the same as that of the third embodiment with the same reference numerals employed to designate part or element corresponding to that shown in FIG. 3 and any further explanation omitted.

Figure 16:
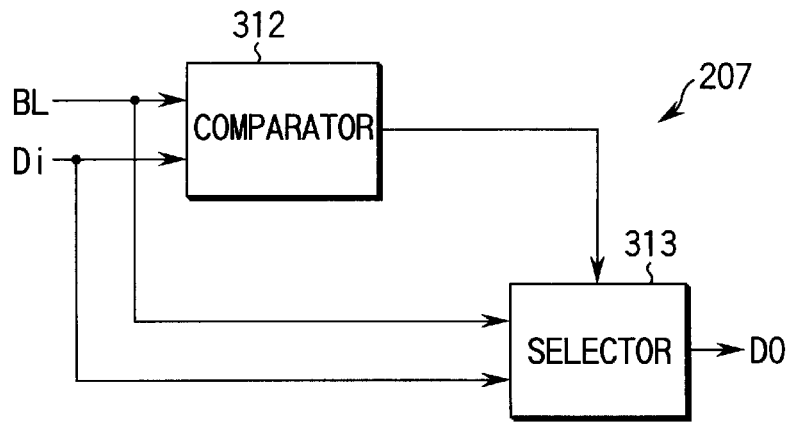
FIG. 16 is a block diagram showing a practical form of an uneven background density suppression section.

FIG. 16 shows a first practical structure of the uneven background density suppression section 207. It comprises a comparator 312 for comparing a background density level BL and input density level Di and a selector 313 for selecting either one of the background density level BL or input density level Di.

Figure 17:
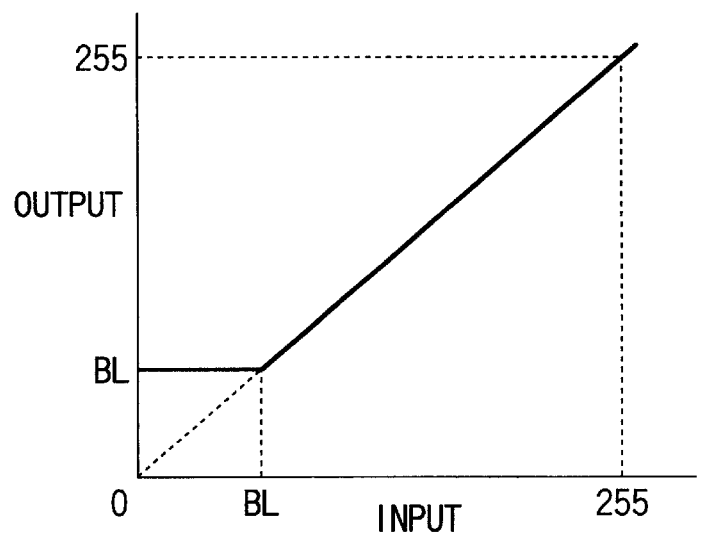
FIG. 17 is a view for explaining a density conversion effected by the uneven background density suppression section of FIG. 16.

That is, the uneven background density suppression section 207 effects density conversion as shown in FIG. 17 and, based on the background density level BL output from a background density distribution calculation section 205, input density level $Di$<background density level $BL$: output level $Do=BL$ input density level $Di \geq$ background density level $BL$: output level $Do=Di$ \hfill (7)

Through this calculation, the image density below the background density is replaced one at a time by a background density level BL and it is possible to suppress any uneven background density and "back page" emergence.

Figure 18:
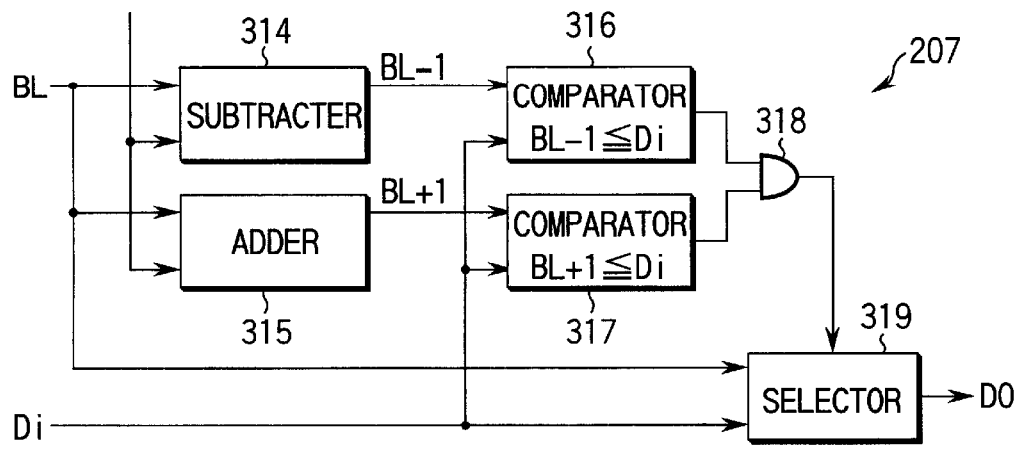
FIG. 18 is a block diagram showing a second practical form of the uneven background density suppression section.

FIG. 18 shows a second practical structure of the uneven background density suppression section 207. It comprises a subtracter 314 for performing a subtraction between a background density level BL and a given level 1, adder 315 for performing an addition between the background density level BL and the given level 1, comparator 316 for comparing the output of the subtracter 314 and an input density level Di, comparator 317 for comparing the output of the adder 315 and input density level Di, AND circuit 318 for Anding the outputs of the comparators 316, 317 and a selector 319 for selecting either one of the background density level BL or input density level Di by the output of the AND circuit.

That is, the uneven background density suppression section 207 is such that, in the case of a color document, it is effective to suppress an uneven shade of density and "back page" emergence, not eliminate the background in the case of the document of a background tone. Further, the uneven background density suppression section 207 is such that, in the case of an image thinner in tone than the background (for example, a white character in the background and a white area of a document setting cover outside the document), it is particularly effective.

Figure 19:
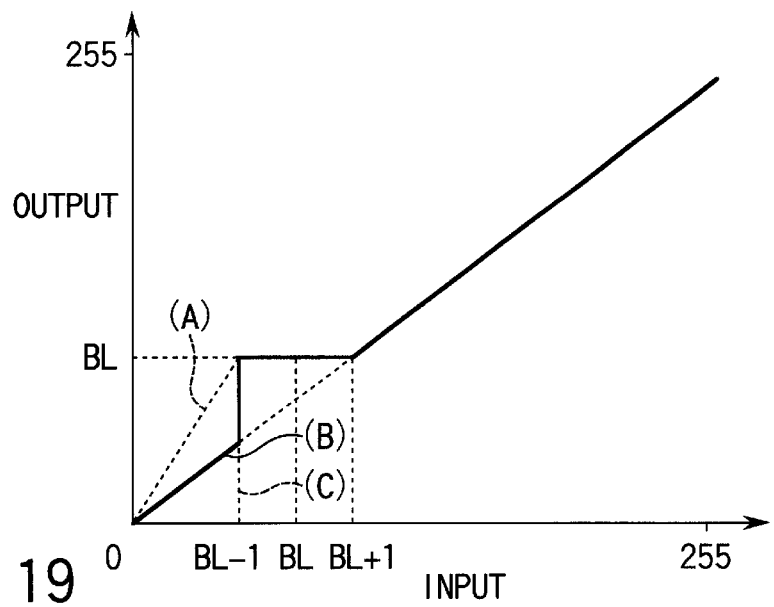
FIG. 19 is a view for explaining density conversion effected by the uneven background density suppression section.

FIG. 18 shows a second practical structure of the uneven background density suppression section 207 and it performs a density conversion shown in FIG. 19. The second uneven background density suppression section 207 performs calculation based on the background density level BL output from the background density distribution calculation section 205:

input density level $Di$<background density level $BL-1$: output level $Do=Di$ input density level $Di \geq$ background density level $BL-1$ and $Di \leq BL+1$: output level $Do=BL$ input density level $Di$>background density level $BL+1$: output level $Do=Di$ (8)

Through the calculation, the image density near the background density is replaced one at a time by the background density level BL and it is possible to suppress an uneven shade of the background tone and "back page" emergence. Further, any image density clearly thinner in tone than the background is reserved.

Next an explanation will be given below about a fifth embodiment. The fifth embodiment detects the peak position of a background density at an image density distribution and a lower edge position of the density distribution showing a spread of the background density and converts the background density from the peak position and lower edge position.

Figure 20:
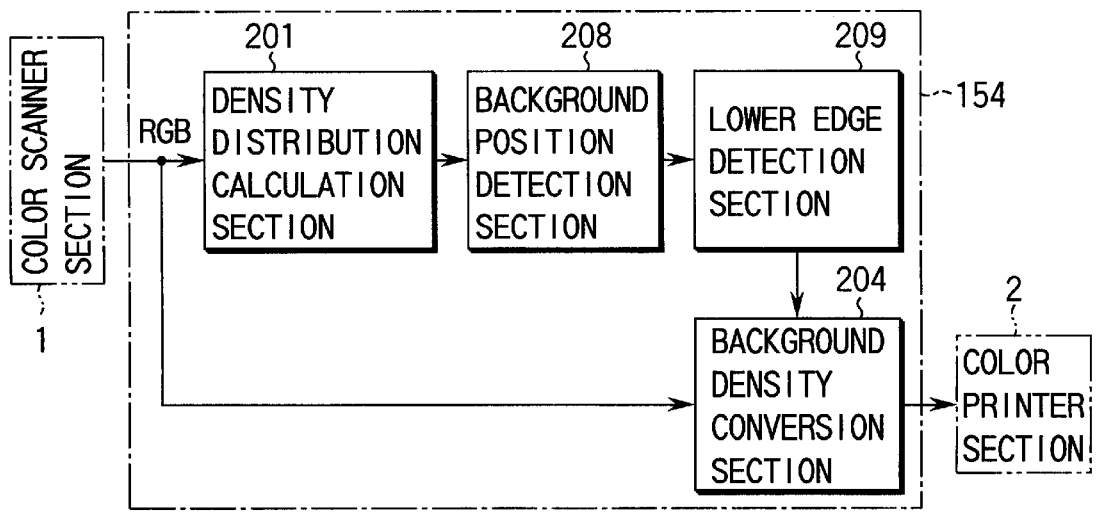
FIG. 20 is a block diagram showing an arrangement of a major section of an image processing apparatus according to a fifth embodiment.

FIG. 20 diagrammatically shows an arrangement of a major portion of an image processing apparatus 36 according to a fifth embodiment. This embodiment is different from the third embodiment in that a background position detection section 208 and lower edge position detection section 209 are used instead of the background density distribution calculation section 205. The remaining portion of the fifth embodiment is the same as that of the third embodiment with the same reference numerals employed to designate part or element corresponding to that of the third embodiment and any further explanation omitted.

An explanation will be given below about the lower edge position detector 209 shown in FIG. 21. The lower edge position is found as a minimal and a maximal density level of a density level H(n) satisfying $H(n) \geq H\mathrm{max} \times k$ (9)

with respect to a frequency value (that is, a density distribution value) continuously decreasing in a monotonic fashion from a peak position (Hmax) of the background density BL. In an example of FIG. 21, a minimum density level BLmin is [0] and a maximum density level BLmax is [3].

Figure 22:
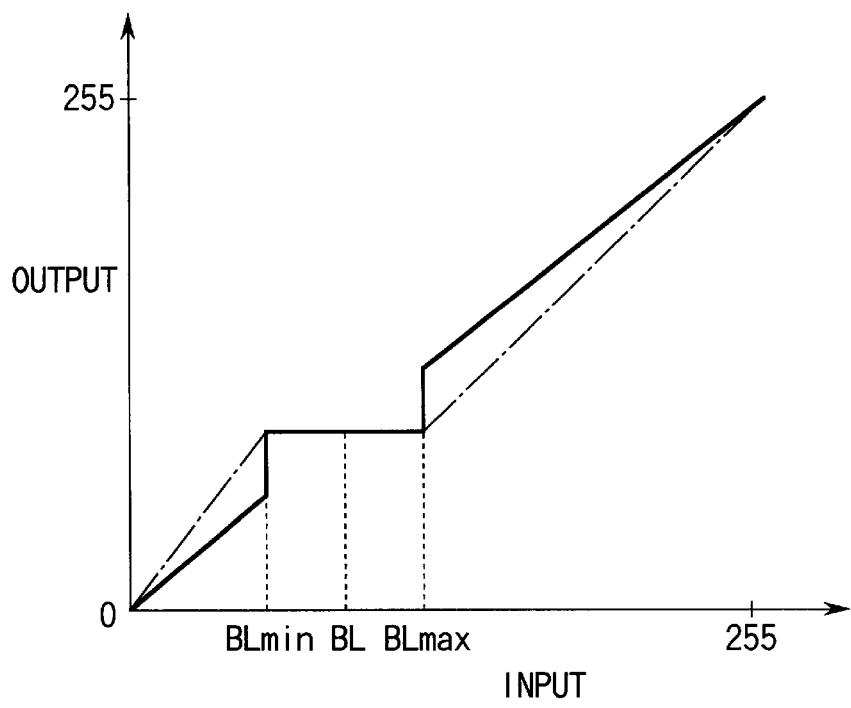
FIG. 22 is a view for explaining a density conversion.

FIG. 22 shows an example of a density conversion based on the lower edge positions BLmin, BLmax and it is possible to effect density conversion as indicated by a solid line or a dash dot line. In the above-mentioned method, density conversion is effected with respect to an input image density included in a density area of a predetermined width with a background density BL as a center. Since, by this method, the density conversion is effected in accordance with the width of the uneven shade of background density, it is possible to effect the image density conversion with higher accuracy.

Also effective is the method by which offset values are given to the lower edge positions BLmin, BLmax as indicated by the following equations:

$BL\mathrm{max}'=BL\mathrm{max}+O\mathrm{max}$ $BL\mathrm{min}'=BL\mathrm{min}+O\mathrm{min}$ (10)

In the example given above, the background density has its positional accuracy determined depending upon the density division number of the density distribution calculation section 201. That is, if the division number is given by n, the positional accuracy becomes.

$\pm 256/2n$ (11)

That is, if the peak position is given by "p", the background density BL corresponding to the image density becomes $BL=(256/n)p+256/2n$ (12)

Here, "p" is a density position having a peak frequency on the histogram and, if the density division number is 16, it is one of 0 to 15. "BL" is a background density and, if the resolution of the scanner section 1 is 8 bits, it is one value of 0 to 255.

Through the utilization of the density distribution before and after the peak position, however, it is possible to calculate or correct the background density BL more precisely. For example, the frequency H(p) of the peak position p is weighted with the frequencies H(p−1) and H(p+1) before/after the peak position and $BL=(256/n)+256/2n+(256/2n) \times (H(p+1)-H(p-1))/2H(p)$ (13)

And it is possible to correct the background density BL.

Figure 21:
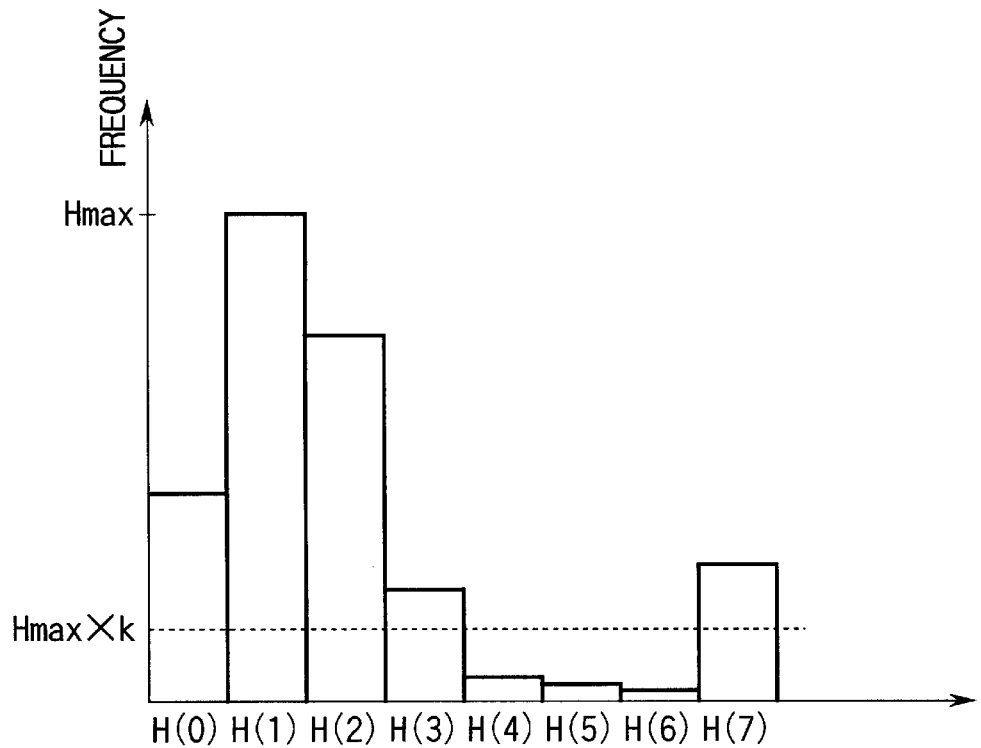
FIG. 21 is a view showing an example of a density distribution.

In this calculation method, as shown in FIG. 21, if the peak position is over "1", it is possible to make correction more accurately. If, on the other hand, the peak position is [0] as shown in FIG. 23A, there arises a problem because of a lack of any distribution below [0]. Although the frequency below [0] is calculated as [0], the accuracy is poor. In the case of a color image in particular, for respective the image data R, G, B or C, M, Y, K, the distribution differs between the case of FIG. 21 and the case of FIG. 23A. If this is the case, a color channel balance is broken and any accurate background elimination and further any accurate density conversion over a whole image density are not carried out, thus leaving a background color tone and causing a color hue over the whole image.

As shown in FIG. 23, in the case of the peak position [0], the frequency below the image density [0] is virtually prepared and, also with the use of a frequency H(−1) below the image density [0] it is possible to carry out accurate image density conversion by the calculation of the equation (13).

Next, an explanation will be given below about a sixth embodiment.

The background removal method is done either in a better way or in a worse way depending upon a document as a target. For example, in the case of a newspaper which is made of an inexpensive paper sheet to make it at low costs, it is effective to remove the background in the situation in which a color sheet needs to be used. On the other hand, there is sometimes the case where a color-printed sheet has to be used intentionally as in the advertisement in which case it is not desirable to remove the background.

In the sixth embodiment, it is considered that decision is made whether or not a background be removed and, if any given document whose background be better to be removed is involved, then it is done so.

FIG. 24 diagrammatically shows an arrangement of a major part of the image processing apparatus 36 according to a sixth embodiment. This embodiment is different from the third embodiment in that a background presence/absence decision section 210 is added which is adapted to decide whether or not a background be removed. The remaining portion of this embodiment is the same as that of the third embodiment with the same reference employed to designate part or element corresponding to that of the third embodiment and any further explanation omitted.

Figure 25:
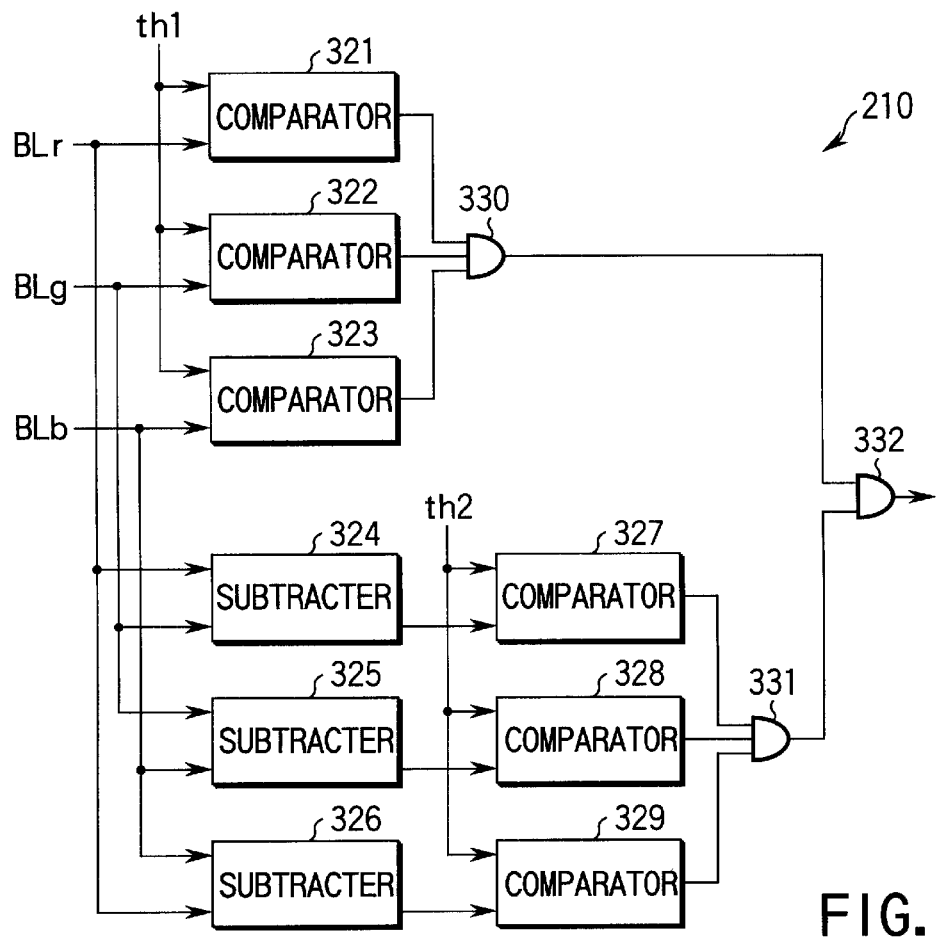
FIG. 25 is a block diagram showing an arrangement of a background presence/absence decision section.

FIG. 25 shows an arrangement of the background presence/absence decision section 210, comprising comparators 321, 322, 323 comparing background density levels BLr, BLg, BLb calculated with respect to color image data R, G, B with a predetermined threshold value th1, subtracter 324 performing calculation between background density levels BLr and BLg, subtracter 325 performing calculation between background density levels BLg and BLb, subtracter 326 performing calculation between the background density levels BLb and BLr, comparators 327, 328, 329 comparing the respective output of the subtracters 324, 325, 326 and a predetermined threshold value th2, AND circuit 330 Anding the respective outputs of the comparators 321, 322, 323, AND circuit 331 Anding the respective outputs of the comparators 327, 328, 329 and OR circuit 332 Oring the respective outputs of the AND circuits 330 and 331. The background presence/absence decision section 210 decides whether or not the background removal be effected in accordance with the following equations (14) and (15). The background removal is effected when satisfying $$BLr<th1 \text{ and } BLg<th2 \text{ and } BLb<th1 \quad (14)$$

and $$|BLb-BLr|<th2$$

That is, the background removal is done when the background density level BLr, BLg, BLb of image data R, G, B are below a predetermined frequency and the level difference of three channels is small.

By the above arrangement, a document whose background is to be removed is decided and the background is removed properly in accordance with the kinds of the documents involved.

Next an explanation will be given below about a seventh embodiment.

The seventh embodiment decides a character/background area from a target document and converts background density on the basis of a result of decision.

Figure 26:
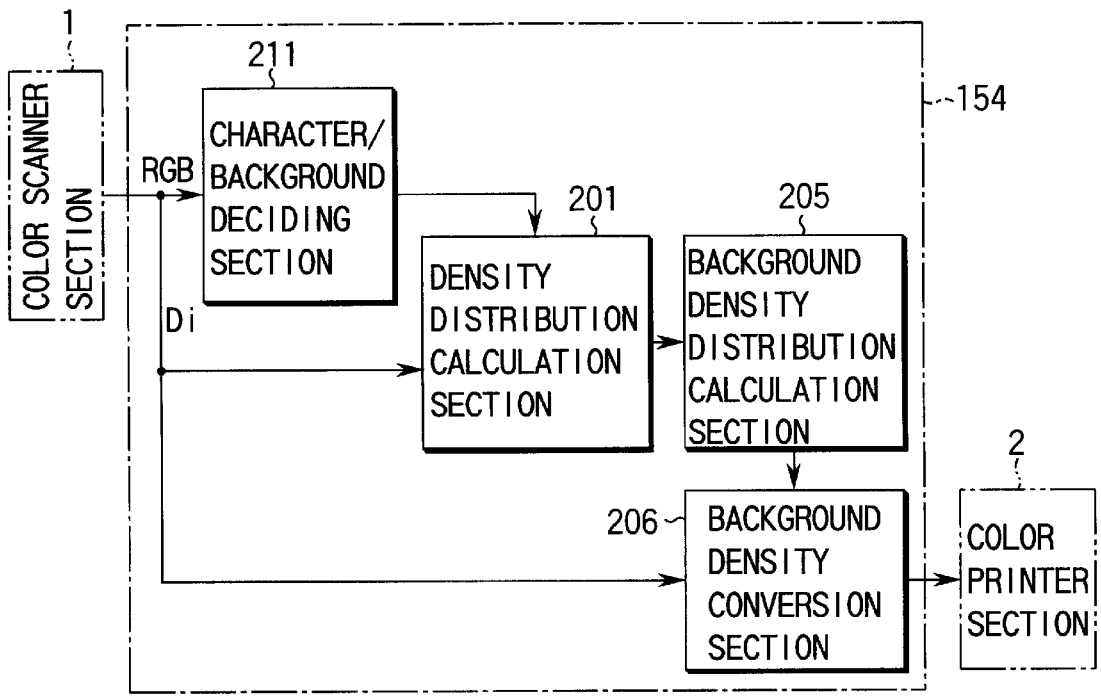
FIG. 26 is a block diagram showing an arrangement of a major section of an image processing apparatus according to a seventh embodiment.

FIG. 26 shows an arrangement of a major portion of an image processing apparatus according to a seventh embodiment. The seventh embodiment comprises a density distribution calculation section 201, background density distribution calculation section 205, background density conversion section 206 and character/background decision section 211 serving as an area deciding means for deciding a character/background area. Incidentally, the density distribution calculation section 201, background density distribution calculation 205 and background density conversion section 206 are the same as those of the above-mentioned third embodiment with the same reference numerals employed to designate part and element corresponding to that of the third embodiment and any further explanation omitted.

That is, the character/background decision section 211 decides the character/underground area from the input image data R, G, B, that is, a character bearing area in the background. The character/background decision section 211 decides, for example, an area of a suddenly varying density gradient as a character/background area. The density distribution calculation circuit 201 calculates the density distribution of input image data R, G, B with respect to an area decided as the character/background area by the character/background decision section 211. The background density distribution calculation section 205 calculates the background density distribution of the document on the basis of the density distribution of the document calculated by the density distribution calculation section 201. The background density conversion section 206 converts the background density of the input image data R, G, B on the basis of the background density distribution calculated by the background density distribution calculation section 205.

Next an explanation will be given below about an eighth embodiment.

The eighth embodiment decides a non-photograph area from a target document and converts a background density on the basis of a result of decision.

Figure 27:
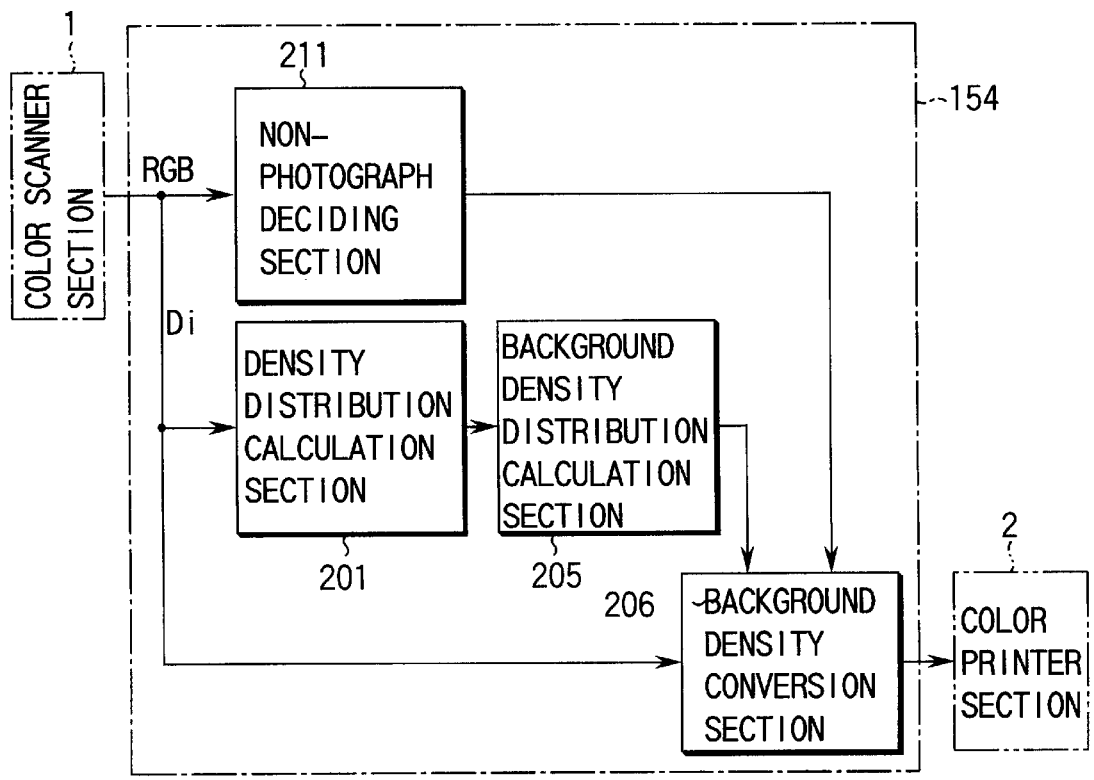
FIG. 27 is a block diagram showing an arrangement of a major section of an image processing apparatus according to an eighth embodiment.

FIG. 27 diagrammatically shows an arrangement of a major section of an image processing apparatus 36 according to an eighth embodiment. The eighth embodiment comprises a density distribution calculation section 201, background density distribution calculation section 205, background density conversion section 206 and non-photograph area deciding section 212. The density distribution calculation section 201, background density distribution calculation section 205 and background density conversion section 206 are the same as those of the above-mentioned third embodiment with the same reference numerals employed to designate part or element corresponding to that of the third embodiment and any further explanation omitted.

That is, the non-photograph area deciding section 212 decides a non-photograph area from the input image data R, G, B. The density distribution calculation section 201 calculates a density distribution of input image data R, G, B. The background density distribution calculation section 205 calculates the background density distribution of the document on the basis of the density distribution calculated by the density distribution calculation section 201. Based on the background density distribution calculated by the background density distribution calculation section 205 the background density conversion section 206 converts the background density with respect to the area decided as the non-photograph area by the non-photograph area deciding section 212 with respect to the input image data R, G, B.

Next an explanation will be given below about a ninth embodiment.

The ninth embodiment decides a character/background area from a target document and converts a background density on the basis of a result of decision.

Figure 28:
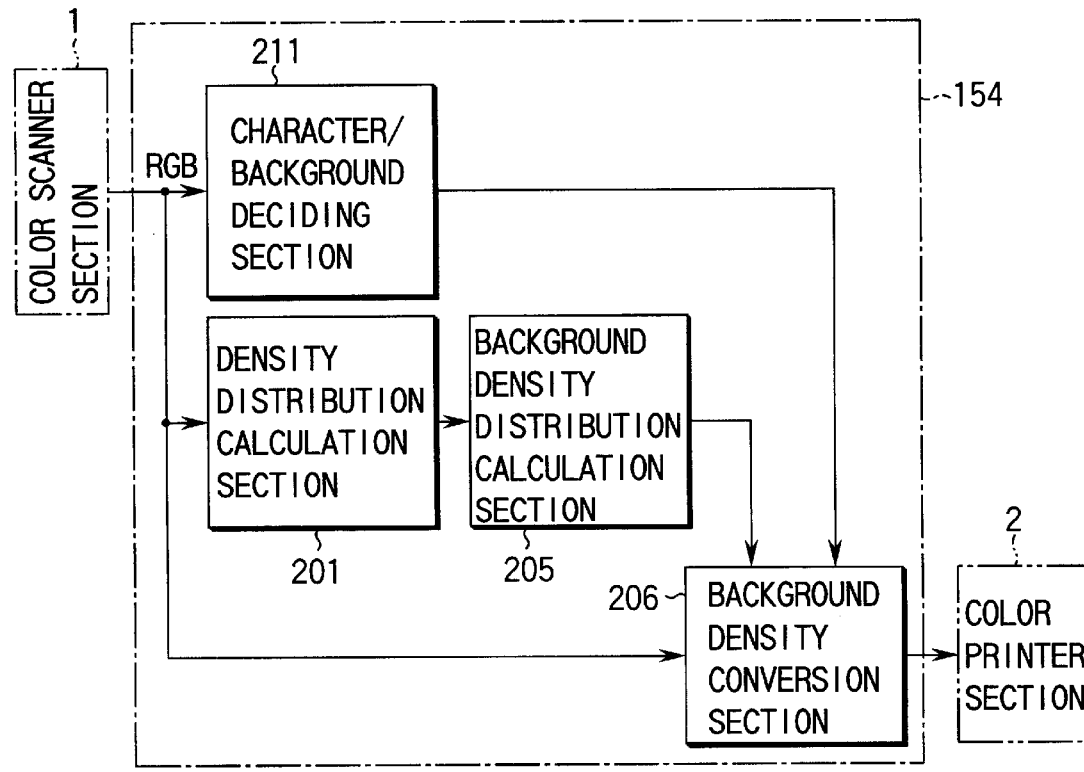
FIG. 28 is a block diagram showing an arrangement of a major section of an image processing apparatus according to a ninth embodiment.

FIG. 28 diagrammatically shows an arrangement of a major section of an image processing apparatus according to the ninth embodiment. The ninth embodiment comprises a density distribution calculation section 201, background density distribution calculation circuit 205, background density conversion section 206 and character/background deciding section 211. It is to be noted that the density distribution calculation section 201, background density distribution calculation section 205, background density conversion section 206 and character/background deciding section 211 are the same as those of the above-mentioned seventh embodiment with the same reference numerals employed to designate part or element corresponding to that of the seventh embodiment and any further explanation omitted.

That is, the character/background deciding section 211 decides the character/background area from input image data R, G, B. The background density distribution calculation section 205 calculates the background density distribution of the document on the basis of the density distribution calculated by the density distribution calculation section 201. Based on the background density distribution calculated by the background density distribution calculation section 205 the background density conversion section 206 converts the background density with respect to an area decided as the character/background area by the character/background deciding section 211 for input image data R, G, B.

Next an explanation will be given below about a tenth embodiment.

The tenth embodiment decides a character/background area and photograph area from a target document and converts the background density by different methods for the character/background area and photograph area.

Figure 29:
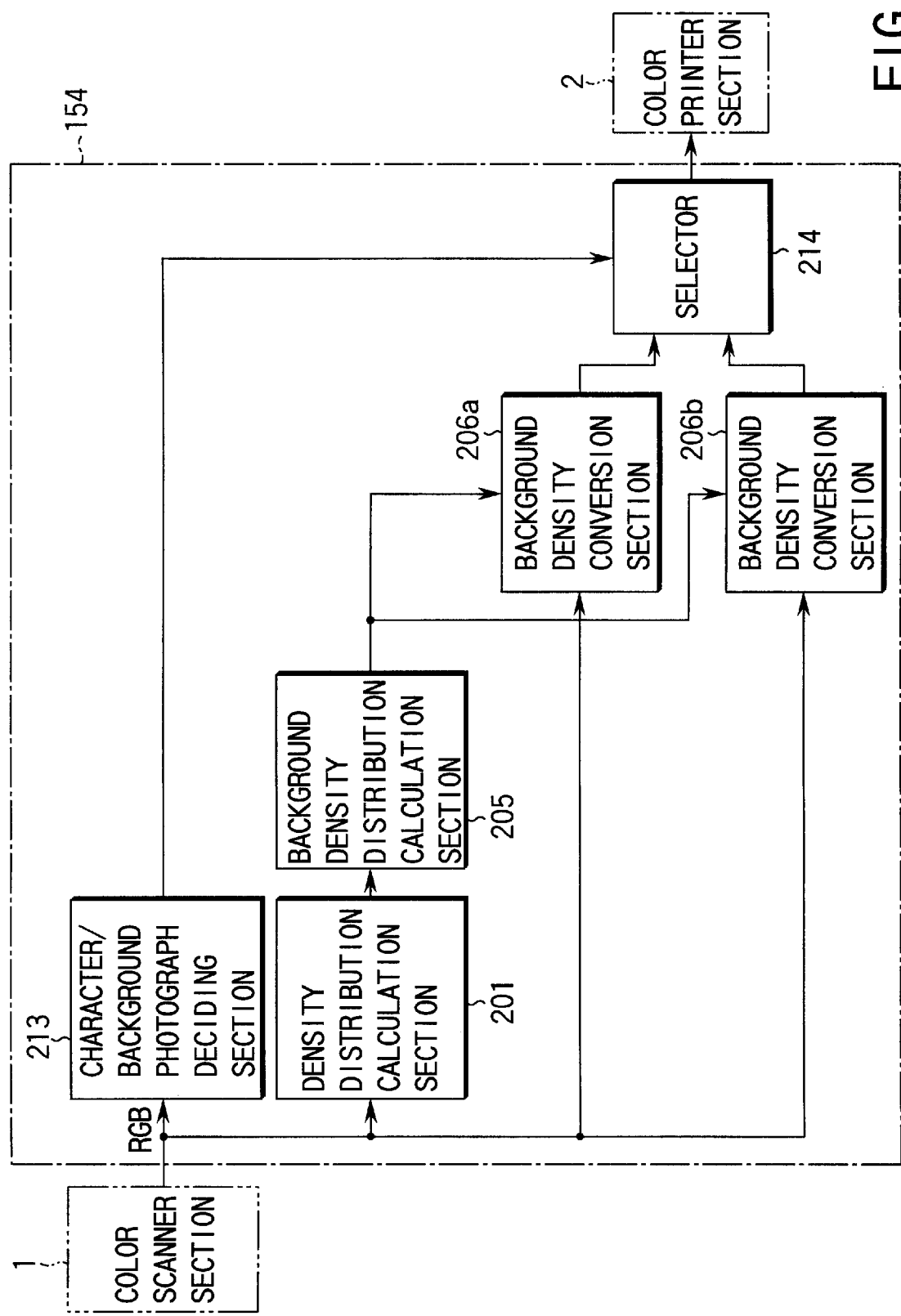
FIG. 29 is a block diagram showing an arrangement of a major section of an image processing apparatus according to a tenth embodiment.

FIG. 29 diagrammatically shows an arrangement of a major section of an image processing apparatus according to the tenth embodiment. The tenth embodiment comprises a density distribution calculation section 201, background density calculation section 205, background density conversion sections 206a, 206b, character/background-photograph deciding section 213 and selector 214. The density distribution calculation section 201 and background density distribution calculation section 205 are the same as those of the third embodiment with the same reference numerals employed to designate part or element corresponding to that of the third embodiment and any further explanation omitted.

That is, the character/background-photograph deciding section 213 decides the character/background area and photograph area from the input image data R, G, B. The density distribution calculation section 201 calculates the input image data R, G, B. The background density distribution calculation section 205 calculates the background density distribution of the document based on the density distribution calculated by the density distribution calculation section 201.

The background density conversion section 206a converts the background density of input image data R, G, B on the basis of the background density distribution calculated by the background density distribution calculation section 205. Based on the background density distribution calculated by the background density distribution calculation section 205 the background conversion section 206b converts background density of input image data R, G, B by a method different from that of the background density conversion section 206a. The selector 214 selects the output of the background density conversion section 206a when the character/background area is decided by the character/background-photograph deciding section 213 and selects the output of the background density conversion section 206b when the photograph area is decided by the character/background-photograph deciding section 213.

Next an explanation will be explained below with respect to an embodiment of FIG. 11.

The embodiment of FIG. 11 manually sets a target document as being a color document or monochrome document and converts background density by a different method relative to the color document or monochrome document.

Figure 30:
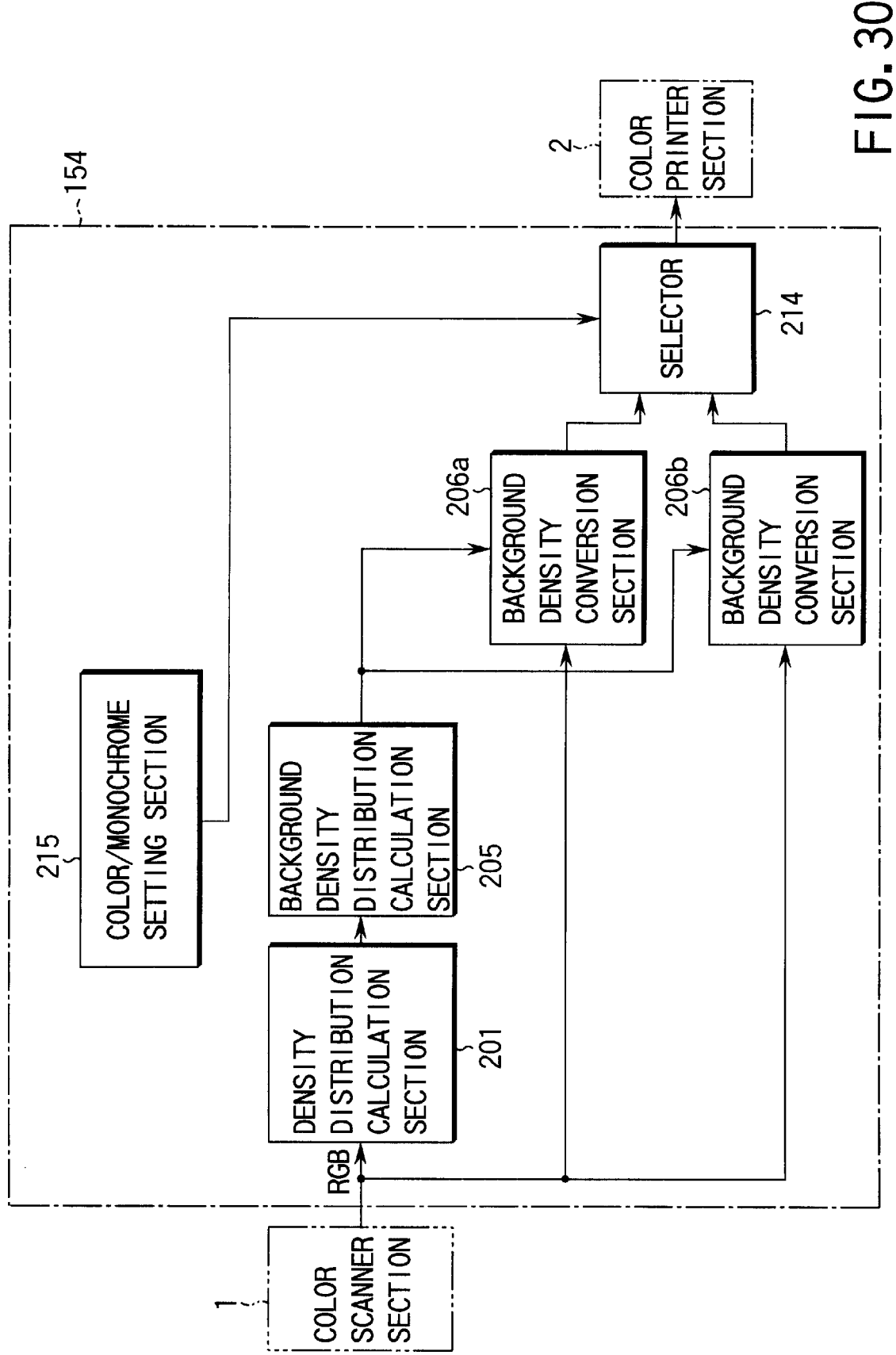
FIG. 30 is a block diagram showing an arrangement of a major section of an image processing apparatus according to an eleventh embodiment.

FIG. 30 shows an arrangement of a major section of an image processing apparatus 36 according to an eleventh embodiment. The embodiment of FIG. 11 comprises a density distribution calculation section 201, background density distribution calculation section 205, background density conversion sections 206a, 206b, selector 214 and color/monochrome setting section 215 for manually setting a target document as being a color document or monochrome document. The density distribution calculation section 201, background density distribution density calculation section 205, background density conversion sections 206a, 206b and selector 214 are the same as those of the tenth embodiment with the same reference numerals employed to designate part or elements corresponding to those of the tenth embodiment and any further explanation omitted.

That is, first, the target document is set as being a color document or monochrome document by the color/monochrome setting section 215. The density distribution calculation section 201 calculates a density distribution of input image data R, G, B. The background density distribution calculation section 205 calculates the background density distribution of the document on the basis of the density distribution calculated by the density distribution calculation section 201.

Based on the background density distribution calculated by the background density distribution calculation section 205 the background density conversion section 206a converts the background density of input image data R, G, B as shown, for example, in FIG. 17. Based on the background density distribution calculated by the background density distribution calculation section 205 the background density conversion section 206b converts the background density of input image data R, G, B, by a method different from that of the background density conversion section 206a, as indicated for example in FIG. 10B. The selector 214 selects the output of the background density conversion section 206a when a color document is set by the color/monochrome setting section 215 and selects the output of the background density conversion section 206b when a monochrome document is set by the color/monochrome setting section 215.

Next an explanation will be given below about a twelfth embodiment.

The twelfth embodiment automatically decides whether a target document is a color document or a monochrome document, and converts background density in a different method relative to the color document or monochrome document.

Figure 31:
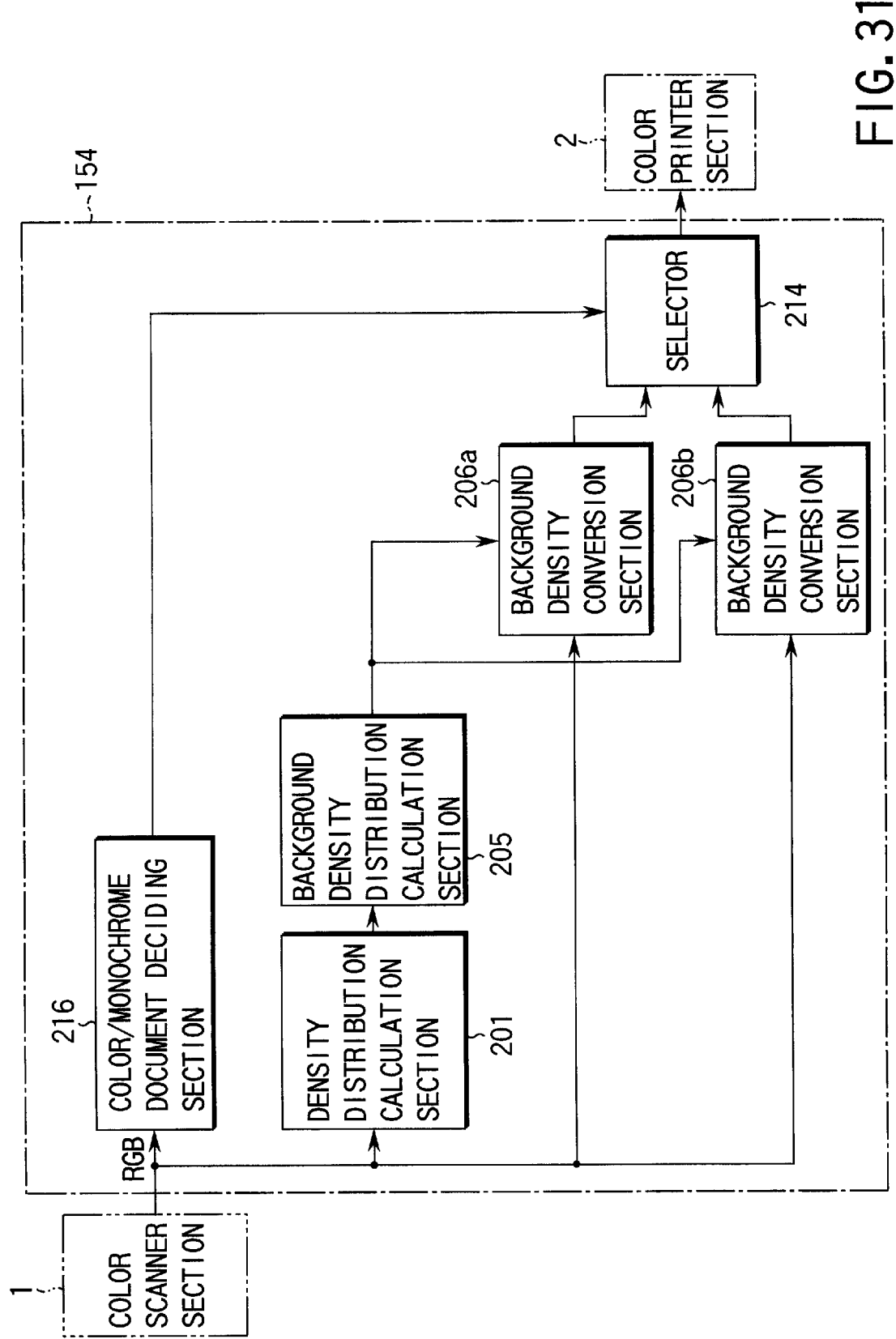
FIG. 31 is a block diagram showing an arrangement of a major section of an image processing apparatus according to a twelfth embodiment.

FIG. 31 shows an arrangement of a major section of an image processing apparatus 36 according to the twelfth embodiment. The twelfth embodiment comprises a density distribution calculation section 201, background density distribution calculation section 205, background density conversion sections 206a, 206b, selector 14 and color/monochrome document deciding section 216 for automatically deciding a target document as being a color document or monochrome document. The density distribution calculation section 201, background density distribution calculation section 205, background density conversion sections 206a, 206b and selector 214 are the same as those of the eleventh embodiment with the same reference numerals employed to designate part or elements corresponding to those of the above-mentioned embodiment and any further explanation omitted.

That is, the color/monochrome document deciding section 216 decides a target document as being a color document or monochrome document on the basis of the density difference among the input image data R, G, B as in the equation (14). The density distribution calculation section 201 calculates the density distribution of input image data R, G, B. The background density distribution calculation section 205 calculates the background density distribution of the document on the basis of the density distribution calculated by the density distribution calculation section 201.

The background density conversion section 206a converts the background density of input image data R, G, B on the basis of the background density distribution calculated by the background density distribution calculation section 205. Based on the background density distribution calculated by the background density distribution section 205 the background density conversion section 206b converts the background density of input image data R, G, B by a method different from that of the background density conversion section 206a. The selector 214 selects the output of the background density conversion section 206a when the color document is decided by the color/monochrome document deciding section 216 and selects the output of the background density conversion section 206b when the monochrome document is decided by the color/monochrome setting section 215.

As set out above, according to the present invention, in the case where a document of a given background is copied, the background density is thinned and a character density is retained. In the case where a document involving a "back page" emergence is copied, the back image is thinned and a surface image density is retained.

According to the present invention, even if a given document includes a photograph, a background density at a character area is converted to another value and the density of a photograph area is faithfully reserved, and the color and density stay unchanged.

Further, according to the present invention, even if a given document has a background color, it is possible to suppress a "back image" emergence while reserving the background color and, at the same time, reduce an uneven shade of the background.

What is claimed is:

1. An image processing apparatus comprising:
   density distribution calculating means for calculating density distribution of a document image on the basis of input document image density data, the density distribution calculation means having multi-value obtaining means for converting input image data to multi-valued image data and histogram preparing means for preparing a density histogram representing color features of the document from the multi-value image data obtained from the multi-value obtaining means,
   density range calculation means for calculating density range corresponding to a background density of the document image on the basis of a density distribution calculated by the density distribution calculating means; and
   conversion means for converting the document image density contained in the background density range calculated by the density range calculation means to another density value.

2. An image processing apparatus comprising:
   density distribution calculating means for calculating density distribution of a document image on the basis of input document image density data, the density distribution calculation means having histogram preparing means for preparing a density histogram representing color features of the document on the basis of the input image data;
   density range calculation means for calculating a density range corresponding to a background density of the document image on the basis of a density distribution calculated by the density distribution calculating means, the density range calculation means having means for determining a density of a greatest frequency in a low density area of the histogram prepared by the histogram preparing means as being a background density level of the document and calculating the background density range on the basis of the background density level; and
   conversion means for converting the document image density contained in the background density range calculated by the density range calculation means to another density value.

3. An image processing apparatus according to claim 2, characterized in that the conversion means has means for converting input image data below the background density level calculated by the density range calculation means to a value "0".

4. An image processing apparatus according to claim 2, characterized in that the conversion means has means for converting input image data below the background density level calculated by the density range calculation means to a value "0" and converting input image data greater than the background density level on the basis of a predetermined function.

5. An image processing apparatus according to claim 2, characterized in that the conversion means has means for converting input image data below the background density level calculated by the density range calculation means to a predetermined value.

6. An image processing apparatus according to claim 2, characterized in that the conversion means has means for converting only input image data in a predetermined density range containing the background density level calculated by the density range calculation means to a predetermined level and outputting the other input image directly.

7. An image processing apparatus according to claim 2, characterized in that the density range calculation means has means for deciding, as being the background density range, a density range near the background density level having a frequency down to a frequency smaller by a predetermined value than a frequency of the background density level relative to the image data.

8. An image processing apparatus according to claim 2, characterized in that the density range calculation means has means which, when there is a deviation of an input image data of a predetermined density range with the background density level as a center, corrects the background density level in accordance with the deviation.

9. An image processing apparatus comprising:
   density distribution calculating means for calculating density distribution of a document image on the basis of input document image density data;
   density range calculation means for calculating a density range corresponding to a background density of the document image on the basis of a density distribution calculated by the density distribution calculating means;
   conversion means for converting the document image density contained in the background density range calculated by the density range calculation means to another density value, and
   deciding means for deciding whether or not the document is a document whose background be removed, wherein the conversion means effects conversion with respect to only image data of the document which is decided as the background being removed by the deciding means.

10. An image processing apparatus according to claim 9, characterized in that the deciding means which, when input image data R, G, B are at a background level of a predetermined density value and there is a small difference among these levels, decides that a background involved be removed.

11. An image processing apparatus comprising:

density distribution calculating means for calculating density distribution of a document image on the basis of input document image density data;

density range calculation means for calculating a density range corresponding to a background density of the document image on the basis of a density distribution calculated by the density distribution calculating means;

conversion means for converting the document image density contained in the background density range calculated by the density range calculation means to another density value; and character/background deciding means for deciding a background area containing characters in input image data, and photograph area deciding means for deciding an area as a photograph area in the input image data, wherein the conversion means effects first background density conversion with respect to an area decided as a background area containing characters and effects second background density conversion with respect to the photograph area, the second background density conversion differing from the first background density conversion.

12. An image processing apparatus comprising:

density distribution calculating means for calculating density distribution of a document image on the basis of input document image density data;

density range calculation means for calculating a density range corresponding to a background density of the document image on the basis of a density distribution calculated by the density distribution calculating means;

conversion means for converting the document image density contained in the background density range calculated by the density range calculation means to another density value; and setting means for setting the document as being a color document or a monochrome document, wherein the conversion means effects first background density conversion with respect to a document set by the setting means as a color document and effects second background density conversion with respect to a monochrome document set as being a monochrome document, the second background density conversion differing from the first background density conversion.

13. An image processing apparatus according to claim 12, characterized in that the first background density conversion converts the image density in a background density conversion range to a predetermined value and the second background density conversion converts an image density in the background density range to a value "0".

14. An image processing apparatus comprising:

density distribution calculating means for calculating density distribution of a document image on the basis of input document image density data;

density range calculation means for calculating a density range corresponding to a background density of the document image on the basis of a density distribution calculated by the density distribution calculating means;

conversion means for converting the document image density contained in the background density range calculated by the density range calculation means to another density value; and deciding means for deciding whether the document is a color document or a monochrome document, wherein the conversion means effects first background density conversion with respect to a document as being a color document and second background density conversion with respect to a document as being a monochrome document, the second background density conversion differing from the first background density conversion.

15. An image processing apparatus according to claim 14, characterized in that the deciding means decides input image data as being monochrome document data when there is a small difference among levels of the input image data R, G, B and as being color document data when otherwise.

16. An image forming apparatus characterized by comprising:

image reading-out means for reading out a document image and outputting image data;

histogram preparing means for preparing a histogram representing color features of the document on the basis of image data output from the image reading-out means;

density range calculation means for determining, as a background density level of the document, a density of a greatest frequency in a low density area of the histogram prepared by the histogram preparing means and calculating the background density range on the basis of the background density level;

conversion means for converting the document image density contained in a background density range calculated by the density range calculation means to another density value and outputting it; and image forming means for forming an image on the basis of image data provided by the conversion means.

17. An image forming apparatus according to claim 16, characterized in that means for converting, to a predetermined value, input image data below the background density level calculated by the density range calculation means.

18. An image forming apparatus according to claim 16, characterized in that the conversion means has a means for converting, to a predetermined value, only input image data contained in a predetermined density range containing the background density level calculated by the density range calculation means and outputting the other input image data directly.

* * * * *